(12) United States Patent
Kaneko et al.

(10) Patent No.: US 12,461,092 B2
(45) Date of Patent: Nov. 4, 2025

(54) SCREENING METHOD FOR APP CLEAVAGE ACTIVITY-CONTROLLING SUBSTANCES OF ADAMTS4

(71) Applicants: SHIMADZU CORPORATION, Kyoto (JP); THE UNIVERSITY OF TOKYO, Tokyo (JP)

(72) Inventors: Naoki Kaneko, Kyoto (JP); Taisuke Tomita, Tokyo (JP); Yota Yoshizawa, Tokyo (JP); Masaya Matsuzaki, Tokyo (JP); Miyabishara Yokoyama, Tokyo (JP)

(73) Assignees: SHIMADZU CORPORATION, Kyoto (JP); THE UNIVERSITY OF TOKYO, Tokyo (JP)

( * ) Notice: Subject to any disclaimer, the term of this patent is extended or adjusted under 35 U.S.C. 154(b) by 791 days.

(21) Appl. No.: 17/606,289

(22) PCT Filed: Mar. 30, 2020

(86) PCT No.: PCT/JP2020/014433
§ 371 (c)(1),
(2) Date: Oct. 25, 2021

(87) PCT Pub. No.: WO2020/217865
PCT Pub. Date: Oct. 29, 2020

(65) Prior Publication Data
US 2022/0326223 A1    Oct. 13, 2022

(30) Foreign Application Priority Data

Apr. 26, 2019  (JP) .................................. 2019-086092

(51) Int. Cl.
*G01N 33/50*   (2006.01)
*C12Q 1/37*    (2006.01)

(52) U.S. Cl.
CPC .......... *G01N 33/5038* (2013.01); *C12Q 1/37* (2013.01)

(58) Field of Classification Search
CPC ....... G01N 33/5038; G01N 2333/4709; G01N 2333/96486; G01N 33/15; C12Q 1/37
See application file for complete search history.

(56) References Cited

U.S. PATENT DOCUMENTS

| | | |
|---|---|---|
| 2009/0305314 A1 | 12/2009 | Beher et al. |
| 2016/0334420 A1 | 11/2016 | Kaneko |
| 2017/0016910 A1 | 1/2017 | Kaneko |
| 2017/0184573 A1 | 6/2017 | Kaneko et al. |
| 2018/0238909 A1 | 8/2018 | Kaneko et al. |

FOREIGN PATENT DOCUMENTS

| | | |
|---|---|---|
| JP | 5838481 B2 | 1/2016 |
| JP | 2017-20980 A | 1/2017 |
| WO | WO-2005108949 A2 * | 11/2005 ......... G01N 33/6896 |
| WO | 2014/027668 A1 | 2/2014 |
| WO | 2015/111430 A1 | 7/2015 |
| WO | 2015/178398 A1 | 11/2015 |
| WO | 2017/047529 A1 | 3/2017 |

OTHER PUBLICATIONS

Kaneko et al. Proc. Jpn. Acad., 2014, Ser. B 90, 353-364 (Year: 2014).*
International Search Report issued Jun. 16, 2020 in International Application No. PCT/JP2020/014433.
Written Opinion of the International Searching Authority issued Jun. 16, 2020 in International Application No. PCT/JP2020/014433.
Rong Wang et al., "The Profile of Soluble Amyloid β Protein in Cultured Cell Media, Detection and quantification of amyloid β protein and variants by immunoprecipitation-mass spectrometry", Journal of Biological Chemistry, vol. 271, No. 50, Issue of Dec. 13, 1996, pp. 31894-31902 (10 pages total).
Isaak Beyer et al., "Solid-Phase Synthesis and Characterization of N-Terminally Elongated Aβ$_{-3-x}$-Peptides", Chemistry Eur. J., 2016, vol. 22, pp. 8685-8693 (9 pages total).
Naoki Kaneko et al., "Identification and quantification of amyloid beta-related peptides in human plasma using matrix-assisted laser desorption/ionization time-of-flight mass spectrometry", Proceedings of the Japan Academy, Ser. B, Physical and Biological Sciences, vol. 90, No. 3, 2014, pp. 104-117 (14 pages total).
Naoki Kaneko et al., "Novel plasma biomarker surrogating cerebral amyloid deposition", Proceedings of the Japan Academy, Ser. B, Physical and Biological Sciences, vol. 90, No. 9, 2014, pp. 353-364 (12 pages total).
Akinori Nakamura et al., "High performance plasma amyloid-β biomarkers for Alzheimer's disease", Nature, Feb. 8, 2018; vol. 554, pp. 249-254 (6 pages total).
Rafaela Peron et al., "Alpha-Secretase ADAM10 Regulation: Insights into Alzheimer's Disease Treatment", Pharmaceuticals, 2018; 11(1), 12 (19 pages total).
Taisuke Tomita et al., "The presenilin 2 mutation (N141I) linked to familial Alzheimer disease (Volga German families) increases the secretion of amyloid β protein ending at the 42nd (or 43rd) residue", Proceedings of the National Academy of Sciences of the U.S.A., vol. 94(5), Mar. 1997, pp. 2025-2030 (6 pages total).
Kunimichi Suzuki et al., "Activity-Dependent Proteolytic Cleavage of Neuroligin-1", Neuron, 76(2), Oct. 18, 2012, pp. 410-422 (13 pages total).

(Continued)

Primary Examiner — Sharmila G Landau
Assistant Examiner — Lioubov G Korotchkina
(74) Attorney, Agent, or Firm — Sughrue Mion, PLLC

(57) ABSTRACT

The present invention provides a method for screening a substance that controls APP669 N-terminal cleavage activity, the method comprising: causing a candidate substance to act on a cultured cell; measuring an Aβ-related peptide produced from the cultured cell; and evaluating APP669 N-terminal cleavage activity. The candidate substance is selected, for example, from the group consisting of a low molecular weight compound, a peptide, a protein, and a nucleic acid. The present invention also provides an APP669 N-terminal cleavage enzyme containing ADAMTS4.

8 Claims, 17 Drawing Sheets

Specification includes a Sequence Listing.

(56) References Cited

OTHER PUBLICATIONS

Anthony R. White et al., "Degradation of the Alzheimer Disease Amyloid β-Peptide by Metal-Dependent Up-Regulation of Metalloprotease Activity", The Journal of Biological Chemistry, vol. 281, No. 26, Jun. 30, 2006, pp. 17670-17680 (12 pages total).
Stefan F. Lichtenthaler et al., "A novel substrate for analyzing Alzheimer's disease γ-secretase", FEBS Letters, 453(3), 1999, pp. 288-292 (5 pages total).
Kunihiko Kanatsu et al., "Decreased CALM expression reduces Aβ42 to total Aβ ratio through clathrin-mediated endocytosis of γ-secretase", Nature Communications, vol. 5, 3386, 2014 (12 pages total).
Notice of Reasons for Refusal dated Sep. 20, 2022 from the Japanese Patent Office in Japanese Application No. 2021-515912.

* cited by examiner

SCREENING METHOD FOR APP CLEAVAGE ACTIVITY-CONTROLLING SUBSTANCES OF ADAMTS4

TECHNICAL FIELD

The present invention relates to a screening method for APP cleavage activity-controlling substances of ADAMTS4.

BACKGROUND ART

Alzheimer's disease (AD) is a principal cause of dementia, and is a neurodegenerative disease occupying more than half of entire dementias. The number of dementia patients is estimated to be about 50 million in the world in 2017, and is expected to be about 82 million in 2030. Also in Japan, the number of dementia patients is presumed to reach 7 million in 2025.

It is considered that amyloid β (Aβ) is deeply involved in the onset of Alzheimer's disease. Aβs of various molecular species are produced when an amyloid precursor protein (APP) that is a single-pass transmembrane protein and consists of 770 residues of amino acids is cleaved by various proteases (see FIG. 1). Principal Aβs are Aβ1-40 consisting of 40 amino acid residues and Aβ1-42 consisting of 42 amino acid residues, and Aβ1-42 has a strong aggregation property. In Alzheimer's disease, senile plaques appear in the brain due to aggregation of Aβ accompanying fibrosis, which is regarded as the first pathological change.

Aβ1-40 and Aβ1-42 are produced from APP respectively through cleavage by β-secretase causing cleavage at the N-terminal and cleavage by γ-secretase causing cleavage at the C-terminal. Besides, α-secretase causing cleavage at the N-terminal of leucine at position 17 of Aβ is known to be present, and α-secretase is involved in production of sAPPα.

It is reported that various Aβ molecular species (namely, Aβ-related peptides) are produced from APP in addition to Aβ1-40 and Aβ1-42, and it is demonstrated that a plurality of Aβ-related peptides are present in human plasma (NPLs 1, 2 and 3).

Among these Aβ-related peptides, APP669-711 (also referred to as Aβ(-3-40)) is reported to be effective as a constituent factor of a blood biomarker to be used for estimating amyloid accumulation in the brain (NPLs 4 and 5). The C-terminal of APP669-711 is the same as the C-terminal of Aβ1-40, and hence is regarded as a site having been cleaved by γ-secretase, but it has not been clarified by which protease the N-terminal of APP669-711 is cleaved.

It has been confirmed that a production amount of Aβ (namely, Aβ1-40 and Aβ1-42) is decreased when sAPPα is produced through cleavage of APP by α-secretase. An approach utilizing this mechanism for suppressing amyloid accumulation in the brain by regulating α-secretase activity for use in treatment of a neurodegenerative disease is reported (NPL 6).

On the other hand, it is known that expression decrease and degradation increase of Reelin, that is, a secretory protein significant for the brain function, can be a cause of a disease such as Alzheimer's disease, and an approach in which a degrading enzyme of Reelin, A disintegrin and metalloproteinase with thrombospondin motifs 3 (ADAMTS-3) is identified to develop an effective method for prevention and treatment of a disease such as Alzheimer's disease based on control of the enzyme activity is reported (WO2014/027668 and Japanese Patent No. 5838481).

WO2015/111430 (US Patent Publication US 2016/0334420) discloses a method for measuring APP cleavage peptides.

Japanese Patent Laying-Open No. 2017-20980 (US Patent Publication US 2017/0016910) discloses a mass spectrometric method for polypeptides.

CITATION LIST

Patent Literature

PTL 1: WO2014/027668
PTL 2: Japanese Patent No. 5838481
PTL 3: WO2015/111430
PTL 4: US Patent Publication No. 2016/0334420
PTL 5: Japanese Patent Laying-Open No. 2017-20980
PTL 6: US Patent Publication No. 2017/0016910

Non Patent Literature

NPL 1: Wang R, Sweeney D. Gandy S E, Sisodia S S: The profile of soluble amyloid beta protein in cultured cell media, Detection and quantification of amyloid beta protein and variants by immunoprecipitation-mass spectrometry, J Biol Chem. 1996; 13; 271(50): 31894-902

NPL 2: Beyer I, Rezaei-Ghaleh N, Klafki H W, Jahn O, Hausmann U, Wiltfang J, Zweckstetter M, Knolker H J: Solid-Phase Synthesis and Characterization of N-Terminally Elongated Aβ-3-x-Peptides, Chemistry, 2016; 13; 22(25): 8685-93

NPL 3: Kaneko N, Yamamoto R, Sato T A, Tanaka K.: Identification and quantification of amyloid beta-related peptides in human plasma using matrix-assisted laser desorption/ionization time-of-flight mass spectrometry, Proc Jpn Acad Ser B Phys Biol Sci. 2014; 90(3): 104-17

NPL 4: Kaneko N, Nakamura A. Washimi Y, Kato T, Sakurai T, Arahata Y, Bundo M, Takeda A, Niida S, Ito K, Toba K. Tanaka K. Yanagisawa K.: Novel plasma biomarker surrogating cerebral amyloid deposition, Proc Jpn Acad Ser B Phys Biol Sci. 2014; 90(9): 353-64

NPL 5: Nakamura A, Kaneko N, Villemagne V L, Kato T, Doecke J, Dore V, Fowler C, Li Q X, Martins R, Rowe C, Tomita T, Matsuzaki K, Ishii K, Ishii K, Arahata Y. Iwamoto S, Ito K, Tanaka K, Masters C L, Yanagisawa K.: High performance plasma amyloid-β biomarkers for Alzheimer's disease, Nature 2018; 8; 554(7691): 249-254

NPL 6: Peron R, Vatanabe I P, Manzine P R, Camins A, Cominetti M R.: Alpha-Secretase ADAM10 Regulation: Insights into Alzheimers Disease Treatment, Pharmaceuticals 2018; 11(1), 12

NPL 7: Tomita T, Maruyama K, Saido T C, Kume H, Shinozaki K, Tokuhiro S, Capell A, Walter J, Grunberg J, Haass C, Iwatsubo T, Obata K.: The presenilin 2 mutation (N141I) linked to familial Alzheimer disease (Volga German families) increases the secretion of amyloid beta protein ending at the 42nd (or 43rd) residue, Proc Nati Acad Sci USA. 1997; 94(5): 2025-30

NPL 8: Suzuki K, Hayashi Y, Nakahara S, Kumazaki H, Prox J, Horiuchi K, Zeng M, Tanimura S, Nishiyama Y. Osawa S, Sehara-Fujisawa A, Saftig P, Yokoshima S. Fukuyama T, Matsuki N, Koyama R, Tomita T, iwatsubo T.: Activity-dependent proteolytic cleavage of neuroligin-1, Neuron, 2012; 76(2): 410-22

NPL 9: White A R, Du T, Laughton K M, Volitakis I, Sharples R A, Xilinas M E, Hoke D E, Holsinger R M, Evin G, Chemy R A, Hill A F, Bamham K J, Li Q X, Bush A I, Masters C L.: Degradation of the Alzheimer disease amyloid beta-peptide by metal-dependent up-regulation of metalloprotease activity, J Biol Chem. 2006; 281(26): 17670-80

NPL 10: Lichtenthaler S F, Multhaup G, Masters C L, Beyreuther K.: A novel substrate for analyzing Alzheimers disease gamma-secretase, FEBS Lett. 1999; 453(3): 288-92

NPL 11: Kanatsu K, Morohashi Y, Suzuki M, Kuroda H, Watanabe T, Tomita T. Iwatsubo T.: Decreased CALM expression reduces Aβ42 to total Aβ ratio through clathrin-mediated endocytosis of γ-secretase, Nat Commun. 2014; 5: 3386

SUMMARY OF INVENTION

Technical Problem

Based on the above-described findings regarding α-secretase, control of activity of an enzyme that cleaves the N-terminal of APP669 (hereinafter, sometimes simply referred to as the APP669 cleavage enzyme) will be of importance, as a method for prevention and treatment of Alzheimer's disease based on production suppression of Aβ (namely, Aβ1-40 and Aβ1-42). A solution to such a technical problem has not been known.

Currently, an APP669 N-terminal cleaving enzyme that is involved in production of APP669-x has not been clarified, and therefore, it is required to first identify such an enzyme.

Then, if a substance that strongly controls (strongly accelerates) APP669 N-terminal cleavage activity is found, this substance can be probably used also for suppressing the production amount of Aβ (Aβ1-40 and Aβ1-42). In other words, a substance that controls APP669 N-terminal cleavage activity can be a drug candidate, and for developing such a substance, a method for screening a control substance is necessary.

Therefore, an object of the present invention is to identify an APP669 N-terminal cleavage enzyme. Besides, an object of the present invention is to provide a method for screening a substance that controls APP669 N-terminal cleavage activity.

Solution to Problem

As a result of earnest studies, the present inventors found that A disintegrin and metalloproteinase with thrombospondin motifs 4 (ADAMTS4) is one of the enzymes that cleave the N-terminal of APP669. Besides, it was also confirmed that Aβ (Aβ1-40 and Aβ1-42) is increased by suppressing production of APP669-x (a peptide having APP669 at the N-terminal), and that an APP fragment having APP669 at the N-terminal is not cleaved by β-secretase (BACE1). Based on these findings, the present invention was accomplished.

A first aspect of the present invention is a method for screening a substance that controls APP669 N-terminal cleavage activity, comprising causing a candidate substance to act on a cultured cell, measuring an Aβ-related peptide produced from the cultured cell, and evaluating APP669 N-terminal cleavage activity.

A second aspect of the present invention is a method for screening a substance that controls APP669 N-terminal cleavage activity, comprising causing, in an in vitro system, ADAMTS4 to act on full length APP or an APP fragment containing a sequence including APP669 and the neighboring residues in the presence of a candidate substance, measuring an APP669-x produced from the full length APP or the APP fragment containing the sequence including APP669 and the neighboring residues; and evaluating APP669 N-terminal cleavage activity.

A third aspect of the present invention is an APP669 N-terminal cleavage agent comprising ADAMTS4.

Advantageous Effects of Invention

The present invention is based on a novel finding that ADAMTS4 cleaves the N-terminal side of the amino acid at position 669 in an amyloid precursor protein (APP) to produce an APP669-x peptide, and provides an APP669 N-terminal cleavage agent comprising ADAMTS4.

According to the present invention, a method for screening a substance that controls APP669 N-terminal cleavage activity with an amount of an APP669-x peptide used as an index is provided.

According to the present invention, a method for screening a substance that controls APP669 N-terminal cleavage activity of ADAMTS4 with an amount of an APP669-x peptide used as an index is provided.

In the screening method of the present invention, in accordance with a change of a production amount of the APP669-x peptide, an amount of amyloid β (Aβ) produced from the same APP is also changed, and therefore, this method is a useful method for screening a substance effective for a molecular target drug or gene therapy focused on ADAMTS4.

It is considered that amyloid β (Aβ) is deeply involved in onset of Alzheimer's disease, and therefore, the screening method of the present invention enables the screening to be useful for developing a preventive agent or a therapeutic agent for Alzheimer's disease based on control of APP669 N-terminal cleavage activity.

DESCRIPTION OF EMBODIMENTS

[ADAMTS4]

Figure 1:
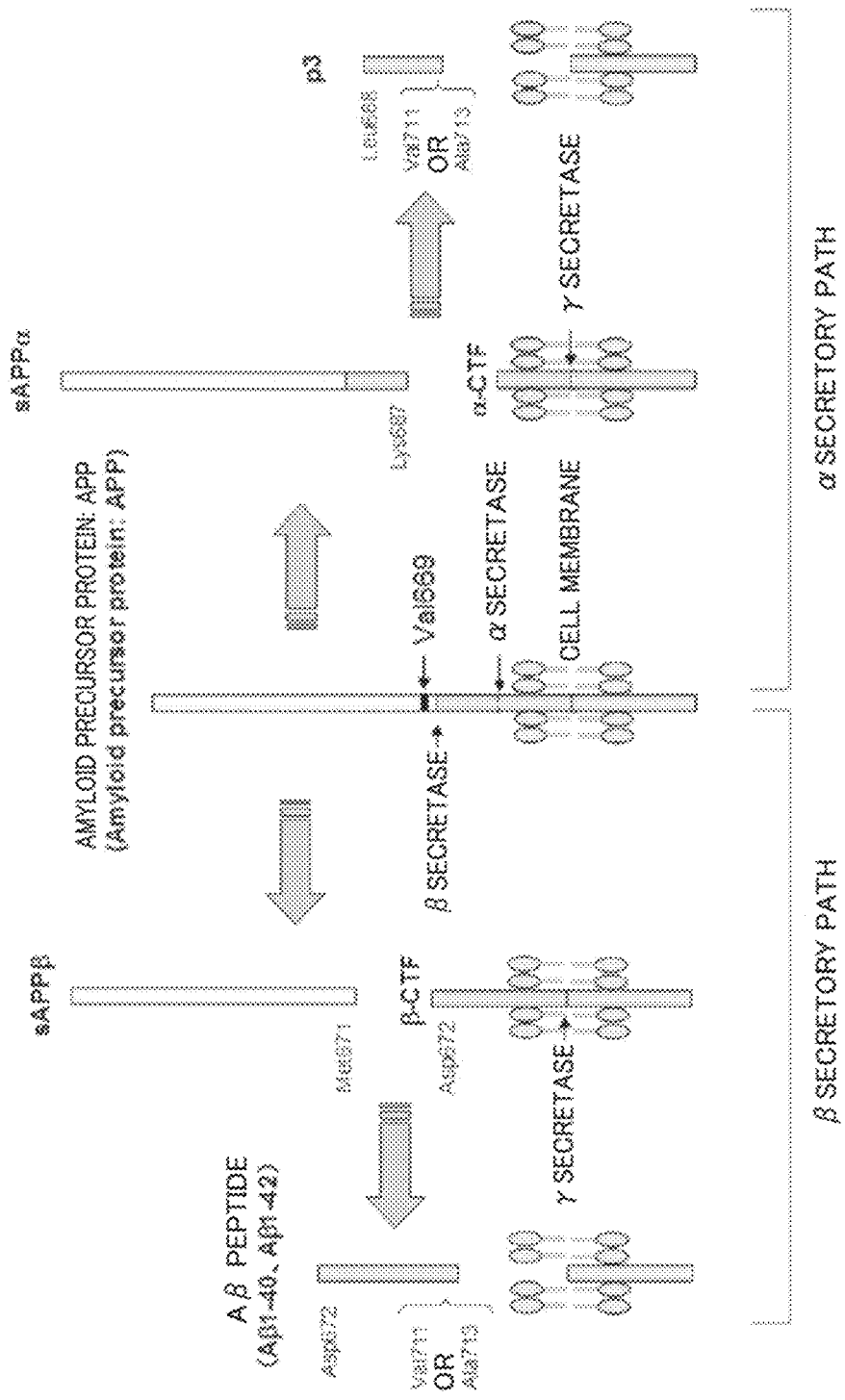
FIG. 1 is a diagram schematically illustrating a formation path of Aβ peptides through degradation of an amyloid precursor protein (APP).

The ADAMTS (A disintegrin and metalloproteinase with thrombospondin motifs) family is a subfamily of ADAM, and is an extracellular protease family found in mammals and the like ADAMTS currently consists of 19 members ADAMTS is classified into some subgroups about a substrate to be cleaved, and ADAMTS1, 4, 5, 8, 9, 15 and 20 belong to a group designated as aggrecanase/proteoglycanase.

As described above, ADAMTS4 is already known, and a gene sequence of ADAMTS4 is registered as NP_005090.3. It is noted that the gene sequence of ADAMTS4 includes two SNPs (rs4233367 and rs41270041), and amino acid substitutions (Q626R and P720A) are caused in a protein encoded thereby.

The present inventors found that ADAMTS4 is one of the enzymes that cleave the N-terminal of APP669. In other words, ADAMTS4 cleaves an N-terminal side of the amino acid at position 669 in an amyloid precursor protein (APP) to produce an APP669-x peptide. Here, full length APP consists of 770 residues of amino acids, and hence, x represents an integer larger than 669 and up to 770.

Accordingly, the present invention provides an APP669 N-terminal cleavage agent comprising ADAMTS4. Besides, in relation to a screening method described below, a method for using ADAMTS4 as an APP669 N-terminal cleavage agent in an in vitro system, and use of ADAMTS4 as an APP669 N-terminal cleavage agent in an in vitro system are provided.

[Method for Screening Substance that Controls APP669 N-Terminal Cleavage Activity]

In one embodiment of the present invention, the screening method is a method for screening a substance that controls APP669 N-terminal cleavage activity, including causing a candidate substance to act on a cultured cell, measuring an Aβ-related peptide produced from the cultured cell, and evaluating APP669 N-terminal cleavage activity.

The Aβ-related peptide includes various molecular species, and among these, a peptide cleaved at the N-terminal of APP669 can be represented as APP669-x. Since full length APP consists of 770 residues of amino acids, x represents an integer larger than 669 and up to 770.

Besides, the Aβ-related peptide includes a peptide cleaved at a position N-terminal to the position 669 in APP. It is presumed that cleavage is caused at various sites in APP depending on a candidate substance.

Examples of the Aβ-related peptide include, but are not limited to, the following peptides: APP663-771, APP664-711, APP666-709, APP666-711, APP669-709 (SEQ ID NO: 3), APP669-710, APP669-711 (SEQ ID NO: 4), APP669-713, APP671-711, APP672-709 (SEQ ID NO: 1), APP672-711 (SEQ ID NO: 2), APP672-713 (SEQ ID NO: 5), and APP674-711

```
APP672-709 (Aβ1-38) (SEQ ID NO: 1):
DAEFRHDSGYEVHHQKLVFFAEDVGSNKGAIIGLMVGG

APP672-711 (Aβ1-40) (SEQ ID NO: 2):
DAEFRHDSGYEVHHQKLYFFAEDVGSNKGAIIGLMVGGVV
```

-continued

```
APP669-709 (Aβ(-3-38)) (SEQ ID NO: 3):
VKMDAEFRHDSGYEVHHQKLVFFAEDVGSNKGAIIGLMVGG

APP669-711 (Aβ(-3-40)) (SEQ ID NO: 4):
VKMDAEFRHDSGYEVHHQKLVFFAEDVGSNKGAIIGLMVGGVV

APP672-713 (Aβ1-42) (SEQ ID NO: 5):
DAEFRHDSGYEVHHQKLVFFAEDVGSNKGAIIGLMVGGVVIA
```

As described above, APP672-709 and Aβ1-38 represent the same peptide. Similarly, APP672-711 and Aβ1-40 represent the same peptide, APP669-709 and Aβ(−3-38) represent the same peptide, APP669-711 and Aβ(−3-40) represent the same peptide, and APP672-713 and Aβ 1-42 represent the same peptide.

In other words, when the Aβ-related peptide is represented as Aβ1-y, y=x−671.

A candidate substance of a substance that controls APP669 N-terminal cleavage activity is caused to act on a cultured cell. This process can be performed by an ordinary cultivation method.

Next, an Aβ-related peptide produced from the cultured cell is measured. This measurement process can be performed by a known method using a culture supernatant sample. The measurement is performed on the Aβ-related peptide (APP669-x and/or an Aβ-related peptide other than APP669-x) which is a measurement target.

In the measurement process, a concentration and/or an amount of the Aβ-related peptide is basically measured, and other units employed by those skilled in the art similarly to a concentration and/or an amount, such as detected ion intensity in mass spectrometry, may be measured.

The measurement of the Aβ-related peptide may be performed by a test based on biomolecule-specific affinity. A test based on biomolecule-specific affinity is a method well known to those skilled in the art, is not particularly limited, and is preferably immunoassay. Specifically, examples of the test include immunoassays including competitive and noncompetitive assay systems, such as Western blotting, radio immunoassay, ELISA (enzyme-linked immunosorbent assay)(including a sandwich immunoassay, a competitive method and a direct adsorption method), immunoprecipitation, precipitation reaction, immunodiffusion, immunoagglutination assay, complement fixation reaction analysis, immunoradiometric assay, fluorescence immunoassay, and protein A immunoassay. In the immunoassays, an antibody binding to an Aβ-related peptide contained in a biological sample is detected.

The measurement of the Aβ-related peptide may be performed by using an antibody immobilized carrier produced using an immunoglobulin having an antigen-binding site capable of recognizing an amyloid precursor protein (APP) derived peptide, or an immunoglobulin fragment including an antigen binding site capable of recognizing an amyloid precursor protein (APP) derived peptide. Through immunoprecipitation using the antibody immobilized carrier, a peptide contained in a sample can be detected with a mass spectrometer (immunoprecipitation-mass spectrometry; IP-MS).

Besides, in the present invention, consecutive immunoprecipitation (cIP) may be performed before detecting a peptide contained in a sample with a mass spectrometer (cIP-MS). When affinity purification is performed two times in a row, impurities that cannot be eliminated through affinity purification performed once can be further reduced through the second affinity purification. Therefore, ionization suppression of the Aβ-related peptide otherwise caused by impurities can be prevented, and even an Aβ-related peptide contained in a minute amount in the sample can be measured by mass spectrometry with a high degree of sensitivity.

In the present invention, the mass spectrometry employed in this case is preferably mass spectrometry by matrix assisted laser desorption/ionization (MALDI) mass spectrometry, electrospray ionization (ESI) mass spectrometry or the like. For example, a MALDI-TOP (matrix assisted laser desorption/ionization-time of flight) mass spectrometer, a MALDI-IT (matrix assisted laser desorption/ionization-ion trap) mass spectrometer, a MALDI-IT-TOF (matrix assisted laser desorption/ionization-ion trap-time of flight) mass spectrometer, a MALDI-FTICR (matrix assisted laser desorption/ionization-Fourier transform ion cyclotron resonance) mass spectrometer, an ESI-QqQ (electrospray ionization-triple quadrupole) mass spectrometer, an ESI-Qq-TOF (electrospray ionization-tandem quadrupole-time of flight) mass spectrometer, an ESI-FTICR (electrospray ionization-Fourier transform ion cyclotron resonance) mass spectrometer, or the like can be used.

Besides, in the MALDI mass spectrometry, a matrix and a matrix solvent can be appropriately determined by those skilled in the art.

As the matrix, for example, α-cyano-4-hydroxycinnamic acid (CHCA), 2,5-dihydroxybenzoic acid (2,5-DHB), sinapinic acid, 3-aminoquinoline (3-AQ) or the like can be used.

The matrix solvent can be selected, for example, from the group consisting of acetonitrile (ACN), trifluoroacetic acid (TFA), methanol, ethanol and water. More specifically, an ACN-TFA aqueous solution, an ACN aqueous solution, a methanol-TFA aqueous solution, a methanol aqueous solution, an ethanol-TFA aqueous solution, an ethanol solution or the like can be used.

In the MALDI mass spectrometry, a matrix additive (comatrix) may be also used. The matrix additive can be appropriately selected by those skilled in the art. As the matrix additive, for example, a phosphonic acid group-containing compound can be used. Specifically, examples of a compound containing one phosphonic acid group include phosphonic acid, methylphosphonic acid, phenylphosphonic acid, and 1-naphthylmethylphosphonic acid. Examples of a compound containing two or more phosphonic acid groups include methylenediphosphonic acid (MDPNA), ethylenediphosphonic acid, ethane-1-hydroxy-1,1-diphosphonic acid, nitrilotriphosphonic acid, and ethylenediaminetetraphosphonic acid. Among these phosphonic acid group-containing compounds, a compound containing, in one molecule, 2 or more, and preferably 2 to 4 phosphonic acid groups is preferred.

Based on the thus measured production amount of the Aβ-related peptide, APP669 N-terminal cleavage activity is evaluated. This evaluation process can be performed, for example, as follows.

If the Aβ-related peptide is APP669-x, for example, an amount of APP669-x in a control cell on which the candidate substance is not acted is used as a reference level, and when an amount of APP669-x in a cell on which the candidate substance is acted is higher than the reference level, it is determined that APP669 N-terminal cleavage activity is increased, and when the amount of APP669-x in the cell on which the candidate substance is acted is lower than the reference level, it is determined that APP669 N-terminal cleavage activity is decreased.

In this case, the evaluation may be performed on only one type of APP669-x, for example, APP669-709. Alternatively, the evaluation may be performed on a plurality of types, such as APP669-709, APP669-711, and APP669-713. When the evaluation is performed on a plurality of types, it is presumed that these plural types are comprehensively evaluated (through comparison in individual amounts and comparison in a total amount) because cleavage activity on the N-terminal side of APP669 is focused on.

If the Aβ-related peptide is APP669-x and an Aβ-related peptide other than APP669-x, for example, in the evaluation of APP669 N-terminal cleavage activity, amounts of APP669-x and the Aβ-related peptide other than APP669-x in a control cell on which the candidate substance is not caused to act are used as reference levels, and when an amount of APP669-x is higher than the reference level and an amount of the Aβ-related peptide other than APP669-x is equivalent to or lower than the reference level in a cell on which the candidate substance is caused to act, it is determined that the APP669 N-terminal cleavage activity is increased; and when the amount of APP669-x is lower than the reference level and the amount of the Aβ-related peptide other than APP669-x is equivalent to or higher than the reference level in the cell on which the candidate substance is caused to act, it is determined that the APP669 N-terminal cleavage activity is decreased.

If the Aβ-related peptide other than APP669-x is Aβ1-y (wherein y=x−671), not only the cleavage activity on the N-terminal side of APP669 but also relevance between production of APP669-x and production of Aβ1-y can be checked, and hence more findings will be obtained. When Aβ1-y (a peptide having the N-terminal in position Aβ1) is thus referred to, the APP669 cleavage activity can be specifically evaluated.

A candidate substance of the substance that controls APP669 N-terminal cleavage activity may be selected from a low molecular weight compound, a peptide, a protein, a nucleic acid and the like. A wide range of various substances are screened.

The low molecular weight compound can be a low molecular weight compound capable of binding to a target polypeptide. An example includes a low molecular weight compound binding to a given protein, like one used in drug discovery. Examples of a low molecular weight compound inhibiting ADAMTS4 include GM6001 and calcium pentosan polysulfate.

The peptide can be a peptide consisting of 2 to 50 amino acid residues. An example includes a soybean peptide having been reported to suppress expression of ADAMTS4.

The protein can be a protein consisting of 50 or more amino acid residues. Examples include IL-1 cytokines and TNF-α having been reported to accelerate expression of ADAMTS4, and TIMP-3 that inhibits ADAMTS4 activity.

The nucleic acid can be, when ADAMTS4 is a target, a nucleic acid (such as a vector, a CRISPR-Cas9 system, a siRNA, a miRNA, an antisense oligonucleotide, or an aptamer) that increases or decreases gene expression of ADAMTS4. Also when an enzyme other than ADAMTS4 is a target, the nucleic acid can be a nucleic acid (such as a vector, a CRISPR-Cas9 system, a siRNA, a miRNA, an antisense oligonucleotide, or an aptamer) that increases or decreases gene expression of the enzyme.

In another embodiment of the present invention, the screening method is a method for screening a substance that controls APP669 N-terminal cleavage activity, including causing, in an in vitro system, ADAMTS4 to act on full length APP or an APP fragment containing a sequence including APP669 and the neighboring residues in the presence of a candidate substance, measuring an APP669-x produced from the full length APP or the APP fragment containing the sequence including APP669 and the neighboring residues, and evaluating APP669 N-terminal cleavage activity.

Based on the novel finding that ADAMTS4 is one of the enzymes that cleave the N-terminal of APP669, a substance that controls APP669 cleavage activity can be screened in vitro through the above-described processes.

The process of evaluating APP669 N-terminal cleavage activity can be performed, for example, as follows.

In the evaluation of APP669 N-terminal cleavage activity, for example, an amount of APP669-x in a control system in which the candidate substance is not present is used as a reference level, and when an amount of APP669-x in a system in which the candidate substance is present is higher than the reference level, it is determined that the APP669 N-terminal cleavage activity is increased, and when the amount of APP669-x in the system in which the candidate substance is present is lower than the reference level, it is determined that the APP669 N-terminal cleavage activity is decreased.

In addition to the amount of APP669-x, an amount of an Aβ-related peptide other than APP669-x may be measured for performing the evaluation. A measurement method and a candidate substance are the same as those described above.

[Screening Kit]

The present invention also provides a kit for screening a substance that controls APP669 N-terminal cleavage activity, and the kit contains ADAMTS4, full length APP or an APP fragment containing a sequence including APP669 and the neighboring residues, and the other components described above.

The APP fragment containing a sequence including APP669 and the neighboring residues refers to an APP fragment containing an amino acid sequence including APP669 and the upstream four and downstream four amino acids [namely, APP665(E), 666(I), 667(S), 668(E), 669(V), 670(K), 671(M), 672(D), and 673(A)], and a portion on the N-terminal side and/or C-terminal side may be longer than that. It is presumed that the fragment may contain a sequence including APP669 and the neighboring residues that is recognized by ADAMTS4.

EXAMPLES

Hereinafter, examples will be described for specifically describing the present invention, and it is noted that the present invention is not limited to these examples. In the following description, an amoxu of a substance expressed in the unit of % is based on the weight when the substance is a solid, and on the volume when it is a liquid, unless otherwise stated.

Neutral surfactants are referred to by the following abbreviations:
n-Decyl-β-D-maltoside (DM)
n-Dodecyl-β-D-maltoside (DDM)
n-Nonyl-β-D-thiomaltoside (NTM)

Example 1: Evaluation of ADAMTS4 Knockout and Action of GM6001 in A549 Cell

In A549 cells, an influence on production of APP669-x caused by ADAMTS4 knockout using CRISPR/Cas9 (clustered regularly interspaced short palindromic repeats/CRISPR associated proteins) and guide RNA (gRNA), and a treatment with GM6001, a metalloprotease inhibitor, was evaluated. A549 cell is human adenocarcinomic alveolar basal epithelial cell. The gRNA was designed using CRISPR Search (https://www.sanger.ac.uk/htgt/wge/find_crisprs).

Vectors in which cDNAs respectively encoding paired gRNAs targeting ADAMTS4 were inserted respectively into vector px335 (Addgene 042335) expressing SpCas9 nickase and gRNA and retrovirus-derived vector pBabe Puro U6 BbsI (donated by Professor Dario Alessi, Dundee University) were constructed.

```
cDNA Sequences inserted into px335:
5'-GCGCTACCTGCTAACAGTGA-3' (SEQ ID NO: 6)

3'-CGCGATGGACGATTGTCACT-5' (namely,

5'-TCACTGTTAGCAGGTAGCGC-3': SEQ ID NO: 7)

cDNA Sequences inserted into pBabe Puro U6 BbsI:
5'-CATTCCACGGTGCGGGGCTA-3' (SEQ ID NO: 8)

3'-GTAAGGTGCCACGCCCCGAT-5' (namely,

5'-TAGCCCCGCACCGTGGAATG-3': SEQ ID NO: 9)
```

These vectors were transfected, and the resultant transfectants were subjected to selection with puromycin for monocloning. A genome was extracted from each monoclonal cell, and a genome fragment including a gene region targeted by gRNA was amplified by PCR to be subjected to sanger sequencing. Primers used for amplifying the genome fragment were as follows:

```
    5'-AGTCAGGAATCCCGTGGGG-3' (SEQ ID NO: 10)

3'-CCTGGGACTGGTGAAACTGTGT-5' (namely,

5'-TGTGTCAAAGTGGTCAGGGTCC-3': SEQ ID NO: 11)
```

Figure 2:
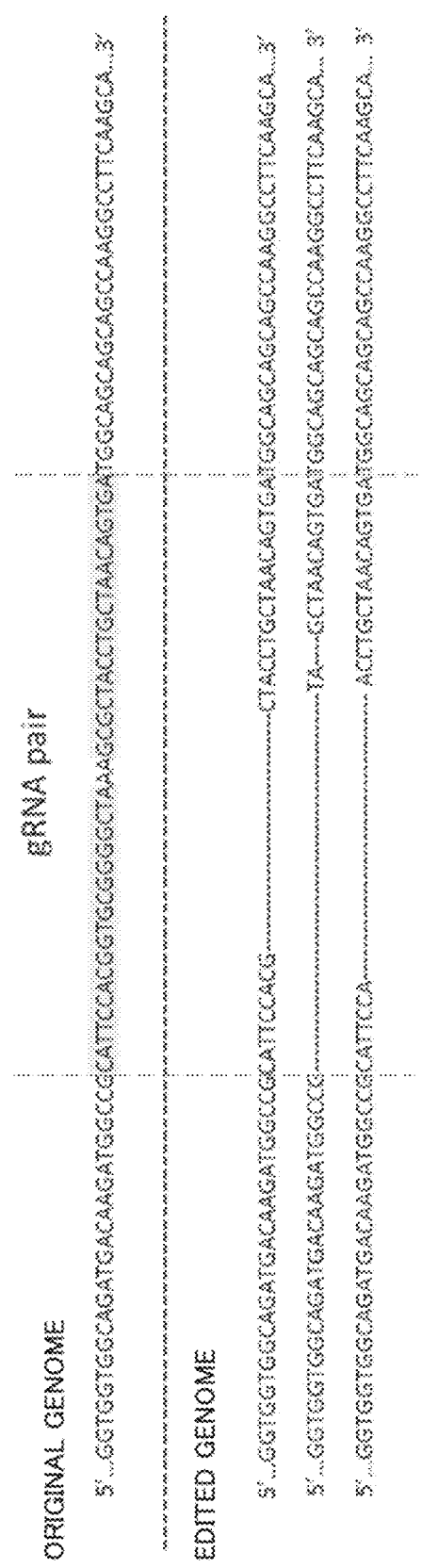
FIG. 2 shows a sequence of an ADAMTS4 gene region modified in A549-ADAMTS4 KO cells. A nucleotide sequence (SEQ ID NO: 12) of original genome is shown in an upper portion, and nucleotide sequences of edited genome (three alleles) are shown in a lower portion: from the top, a sequence having deletion of 16 bp (SEQ ID NO: 13), a sequence having deletion of 29 bp (SEQ ID NO: 14); and a sequence having deletion of 20 bp (SEQ ID NO: 15).

As a result of analysis of a plurality of monoclonal cells, it was presumed that ADAMTS4 gene region of A549 cell has three alleles. Then, a monoclonal cell respectively having deletion of 16 bp, 29 bp and 20 bp in the gene region of ADAMTS4 gene as shown in FIG. 2 was obtained. Since none of these is a multiple of 3, it is presumed that normal ADAMTS4 protein is not expressed. Therefore, it was regarded that this cell is A549 cell having endogenous ADAMTS4 knockout (KO) (A549-ADAMTS4 KO cell).

FIG. 2 illustrates sequences of modified ADAMTS4 gene region in A549-ADAMTS4 KO cell.

An upper portion illustrates a nucleotide sequence of the original genome:

(SEQ ID NO: 12)
GGTGGTGGCAGATGACAAGATGGCCGCATTCCACGGTGCGGGGCTAAAGC

GCTACCTGCTAACAGTGATGGCAGCAGCAGCCAAGGCCTTCAAGCA

A lower portion illustrates nucleotide sequences of edited genome (three alleles), in which the following sequences are illustrated from the top in the following order:

a sequence having deletion of 16 bp:
(SEQ ID NO: 13)
GGTGGTGGCAGATGACAAGATGGCCGCATTCCACGCTACCTGCTAACAGT

GATGGCAGCAGCAGCCAAGGCCTTCAAGCA, a sequence having deletion of 29 bp:
(SEQ ID NO: 14)
GGTGGTGGCAGATGACAAGATGGCCGTAGCTAACAGTGATGGCAGCAGCA GCCAAGGCCTTCAAGCA,
and a sequence having deletion of 20 bp:
(SEQ ID NO: 15)
GGTGGTGGCAGATGATCAAGATGGCCGCATTCCAACCTGCTAACAGTGAT

GGCAGCAGCAGCCAAGGCCTTCAAGCA

A metalloprotease inhibitor, GM6001 (25 µM), or dimethylsulfoxide (DMSO) used as a control was added to each of A549-ADAMTS4 KO cells and A549-wild type (wt) cells, and the resultant cells were incubated for 96 hours. Thereafter, a culture supernatant was collected, and stored at −80° C. until measurement.

An Aβ-related peptide contained in the culture supernatant was measured by IP-MS corresponding to a combination of immunoprecipitation (IP) and mass spectrometry (MS). In IP, antibody immobilized beads obtained by covalent binding of anti-Aβ antibody clone 6E10 (BioLegend) to Dynabeads Epoxy (Thermo Fisher Scientific) were used.

The cryopreserved culture supernatant was thawed, and 250 µL of a reaction liquid containing internal standard peptides [800 mM GlcNAc, 0.2/a (w/v) NTM, 0.2% (w/v) DDM, 300 mM NaCl, and 100 mM Tris-HCl buffer (pH 7.4)] was mixed with 250 µL of the culture supernatant. The thus obtained mixture was mixed with the antibody immobilized beads, followed by an antigen antibody reaction at 4° C. for 1 hour. As the internal standard peptides, 22 µM stable isotope labeled Aβ1-38 and 100 µM stable isotope labeled A31-15 were used.

After the antigen antibody reaction, the antibody immobilized beads were washed with a first washing buffer [washed once with 100 µL of the first washing buffer (0.1% DDM, 0.1% NTM, 50 mM Tris-HCl (pH 7.4) and 150 mM NaCl), and then once with 50 µL of a 50 mM ammonium acetate buffer]. Thereafter, the Aβ-related peptide captured by the antibody immobilized beads was eluted with a glycine buffer containing DDM (50 mM glycine buffer containing 0.1% of DDM, pH 2.8). To the thus obtained eluate, Tris buffer containing DDM [800 mM GlcNAc, 0.2% (w/v) DDM, 300 mM NaCl, and 300 mM Tris-HCl buffer (pH 7.4)] was added to restore the pH to neutral (pH 7.4). Thereafter, the neutral eluate was contacted with the antibody immobilized beads at 4° C. for 1 hour again to cause the antigen antibody reaction of the Aβ-related peptide. The resultant was washed with a second washing buffer [washed twice with 100 µL of the second washing buffer (0.1% DDM, 150 mM Tris-HCl (pH 7.4), and 150 mM NaCl), and once with 50 µL of a 50 mM ammonium acetate buffer], and then, the Aβ-related peptide captured by the antibody immobilized beads was eluted with an eluent (5 mM HCl, 0.1 mM methionine, and 70% (v/v) acetonitrile). In this manner, each eluate containing the Aβ-related peptide was obtained through two-stage IP operation.

As a matrix for linear TOF, α-cyano-4-hydroxycinnamic acid (CHCA) was used. A matrix solution was prepared by dissolving 1 mg of CHCA in 1 mL of 70% (v/v) acetonitrile. As a matrix additive, 0.4% (w/v) methylenediphosphonic acid (MDPNA) was used. A 1 mg/mL CHCA solution and 0.4% (w/v) MDPNA were mixed in equivalent amounts to obtain a matrix/matrix additive solution [0.5 mg/mL CHCA/0.2% (w/v) MDPNA].

Precedently, 0.5 µL of the matrix/matrix additive solution was added in a dropwise manner into respective wells of µFocus MALDI Plate™ 900 µm (Hudson Surface Technology, Inc., Fort Lee, NJ), and then dried.

Each eluate resulting from IP was added in a dropwise manner into 4 wells of the µFocus MALDI Plate™ 900 µm, and then dried.

Mass spectral data was obtained by linear TOF in the positive ion mode using AXIMA Performance (Shimadzu/KRATOS, Manchester, UK). An m/z value of linear TOF was indicated as an average mass of peaks. The m/z value was calibrated using, as external standards, human angiotensin II, human ACTH fragment 18-39, bovine insulin oxidized beta-chain, and bovine insulin.

In the mass spectrum, signal intensity of each Aβ-related peptide was normalized using an internal standard peptide. Thereafter, an average of four normalized intensities obtained from one sample was obtained, which was evaluated as a production amount of the Aβ-related peptide. When there were two or more data not reaching a lower detection limit (S/N<3), it was regarded as undetectable.

with the control using DMSO (FIGS. 3 to 6). ADAMTS4 is a metalloprotease, and is known to be inhibited by GM6001. Therefore, it is presumed that the ADAMTS4 activity was inhibited by GM6001 and hence the production amounts of APP669-711 (Aβ(−3-40)) and APP669-709 (Aβ(−3-38)) were decreased.

These are results revealing that ADAMTS4 is involved in APP669 cleavage (on the N-terminal side), and also reveal that decrease of APP669 cleavage activity can be evaluated by grasping the decrease of APP669-711 (Aβ(−3-40)) and/or APP669-709 (Aβ(−3-38)) by this method. It is, however, presumed that there are, in addition to ADAMTS4, other enzymes that cleave the N-terminal of APP669. The reason is that APP669-x was not completely eliminated even in ADAMTS4 KO cell, and that APP669-x was decreased by causing GM6001 to act on ADAMTS4 KO cells, and thus, these results also reveal that an unknown metalloprotease is involved in the production of APP669-x in ADAMTS4 KO cell.

Table 1 shows amino acid sequences of Aβ1-38, Aβ1-40. APP669-709 (Aβ(−3-38)), and APP669-711 (Aβ(−3-40)).

TABLE 1

| SEQ ID NO: | Peptide Name | Sequence |
|---|---|---|
| 1 | Aβ1-38 | DAEFRHDSGYEVHHQKLVFFAEDVGSNKGAIIGLMVGG |
| 2 | Aβ1-40 | DAEFRHDSGYEVHHQKLVFFAEDVGSNKGAIIGLMVGGVV |
| 3 | APP669-709 (Aβ-3-38) | VKMDAEFRHDSGYEVHHQKLVFFAEDVGSNKGAIIGLMVGG |
| 4 | APP669-711 (Aβ-3-40) | VKMDAEFRHDSGYEVHHQKLVFFAEDVGSNKGAIIGLMVGGVV |

Figure 3:
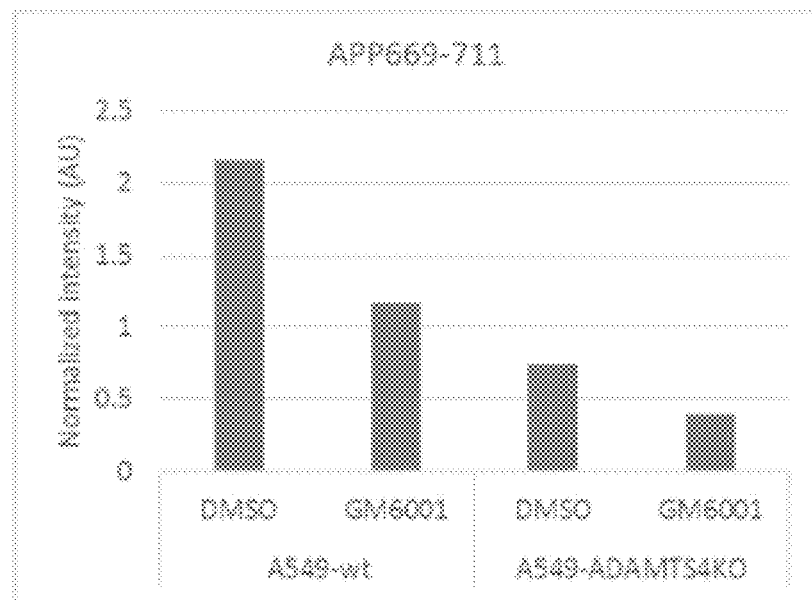
FIG. 3 is a graph demonstrating a production amount of APP669-711 in a culture supernatant obtained when GM6001 (25 μM) or DMSO used as a control was added to A549-ADAMTS4 KO cells and A549-wt cells in Example 1, in which the ordinate indicates an average of normalized intensities.
Figure 4:
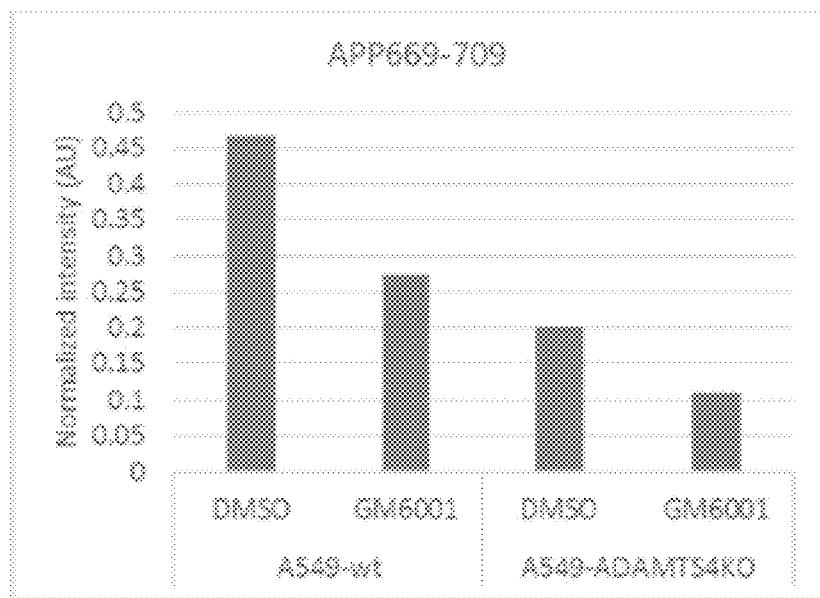
FIG. 4 is a graph demonstrating a production amount of APP669-709 obtained in Example 1.
Figure 5:
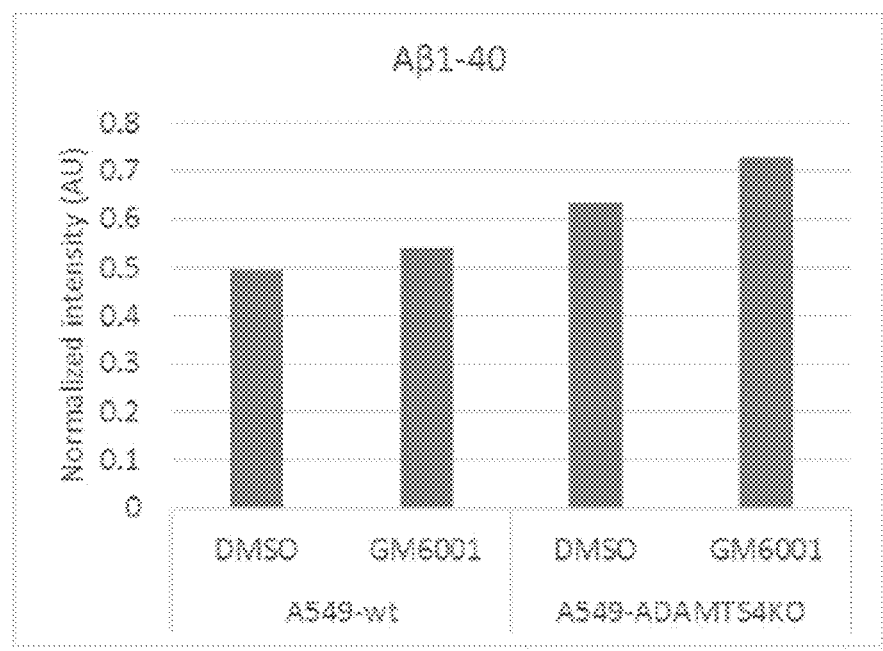
FIG. 5 is a graph demonstrating a production amount of Aβ1-40 obtained in Example 1.
Figure 6:
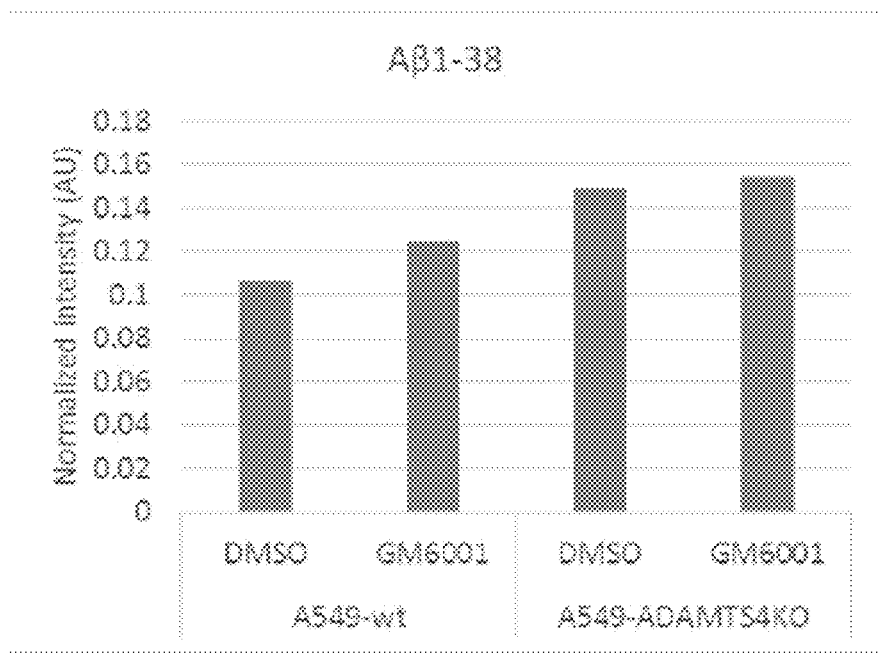
FIG. 6 is a graph demonstrating a production amount of Aβ1-38 obtained in Example 1.

Results are shown in FIGS. 3 to 6. Each of FIGS. 3 to 6 is a graph demonstrating a production amount of the Aβ-related peptide in a culture supernatant obtained when GM6001 (25 µM) or DMSO used as a control is added to each of A549-ADAMTS4 KO cell and A549-wt cell, in which the ordinate indicates an average of normalized intensities FIG. 3 is a graph demonstrating the production amount of APP669-711, FIG. 4 is a graph demonstrating the production amount of APP669-709, FIG. 5 is a graph demonstrating the production amount of Aβ1-40, and FIG. 6 is a graph demonstrating the production amount of Aβ1-38.

The production amounts of APP669-711 (Aβ(−3-40)) and APP669-709 (Aβ(−3-38)) in A549-ADAMTS4 KO cells was decreased to a half or less as compared with those in A549-wt cells (FIGS. 3 and 4). On the other hand, the production amounts of Aβ1-40 which has the N-terminal side different from and the C-terminal side the same as APP669-711 (Aβ(−3-40)), and Aβ1-38 which has the N-terminal side different from and the C-terminal side the same as APP669-709 (Aβ(−3-38)), tended to be rather slightly increased in A549-ADAMTS4 KO cells as compared with those in A549-wt cells (FIGS. 5 and 6). The result that the production amount of a peptide having APP669 at the N-terminal is decreased by knockout of ADAMTS4 reveals that ADAMTS4 is involved in cleavage of the N-terminal of APP669.

Besides, when GM6001, a metalloprotease inhibitor, was caused to act, the production amounts of APP669-711 (Aβ(−3-40)) and APP669-709 (Aβ(−3-38)) tended to be decreased to substantially a half and the production amounts of Aβ-40 and Aβ1-38 tended to be rather increased in both A549-ADAMTS4 KO cells and A549-wt cells as compared Example 2: Evaluation by Transfection of ADAMTS4 into APP Stable HEK Cells An influence of overexpression of ADAMTS4 on the production of APP669-x was evaluated.

As a vector for expressing human APP, a vector obtained by inserting cDNA of human APP (695 amino acid isoforms) into a mammalian cell expression vector pcDNA3.1 was used (NPL 7), and thus, APP stable HEK in which human APP was stably expressed in human embryonic kidney cell 293 (HEK cell) was produced. Besides, cDNA library was created from all mRNA of human neuroblastoma-derived BE2(C) cells (purchased from ATCC) to clone human ADAMTS4 gene by PCR.

Primers Used in Cloning:

5'-GGAGACCCAAGCTGGaccatgtcccagacaggctcgc-3' (SEQ ID NO: 16)

3'-ggacccgcccgtcctttattCGCAAATTGAATTCGAACCA-5'

(namely, 5'-ACCAAGCTTAAGTTTAAACGCttatttccgcccg cccagg-3': SEQ ID NO: 17)

In the sequence of each primer described above, a sequence overlapping with the sequence of an original vector in inserting the sequence of ADAMTS4 into the original vector is shown with capital letters, and the sequence of ADAMTS4 is shown with small letters. It is noted that the letters "acc" at the beginning of the small letters do not correspond to the sequence of ADAMTS4 itself, but a Kozak sequence (acc) for increasing efficiency in translation of ADAMTS4 is thus inserted.

An ADAMTS4 plasmid vector was constructed by inserting, by HiFi Assembly, cDNA of human ADAMTS4 into pcDNA3.1 hygro+ vector in which the neomycin/kanamycin resistance gene of pcDNA3.1 had been substituted with a hygromycin resistance gene. The thus obtained cDNA sequence is shown as SEQ ID NO: 18, and an amino acid sequence encoded by the sequence is shown as SEQ ID NO: 19. This cDNA matched the ADAMTS4 gene sequence NP_005090.3 registered in database by 100%. It is noted that the ADAMTS4 gene includes two SNPs (rs4233367 and rs41270041), which respectively cause amino acid substitutions (Q626R and P720A).

The vector and empty pcDNA3.1 hygro+ vector were co-transfected in a ratio of 1:10 or 10:1. As controls, a cell not transfected with the vectors (mock) and a cell transfected with empty pcDNA3.1 hygro+ vector alone (empty) were also prepared. After 6 hours, the medium was replaced with a new DMEM medium, and a culture supernatant was collected after 48 hours. The culture supernatant was subjected to measurement by IP-MS similar to that of Example 1. As an antibody used in IP, however, an anti-Aβ antibody clone 4G8 (Bio Legend) was used, and as an internal standard peptide, 22 μM stable isotope labeled Aβ1-38 alone was used.

Figure 7:
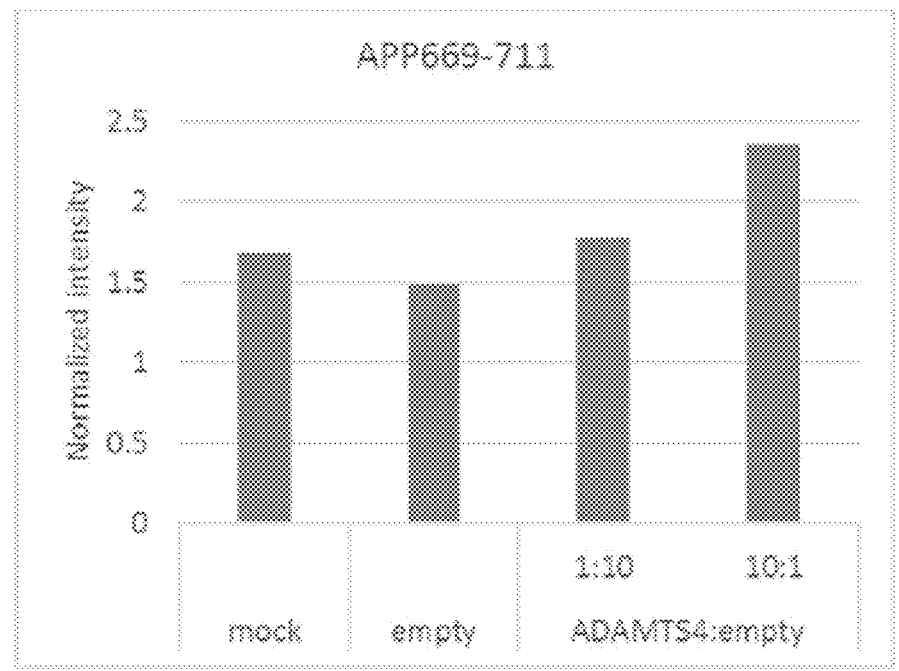
FIG. 7 is a graph demonstrating a production amount of APP669-711 in a culture supernatant obtained when ADAMTS4 plasmid vector and empty pcDHA3.1 hygro+ vector are co-transfected into APP stable HEK in a ratio of 1:10 or 10:1 in Example 2, in which a cell not transfected with the vectors (mock) and a cell transfected with empty pcDNA3.1 hygro+ vector alone (empty) were used as controls. The ordinate indicates an average of normalized intensities.
Figure 8:
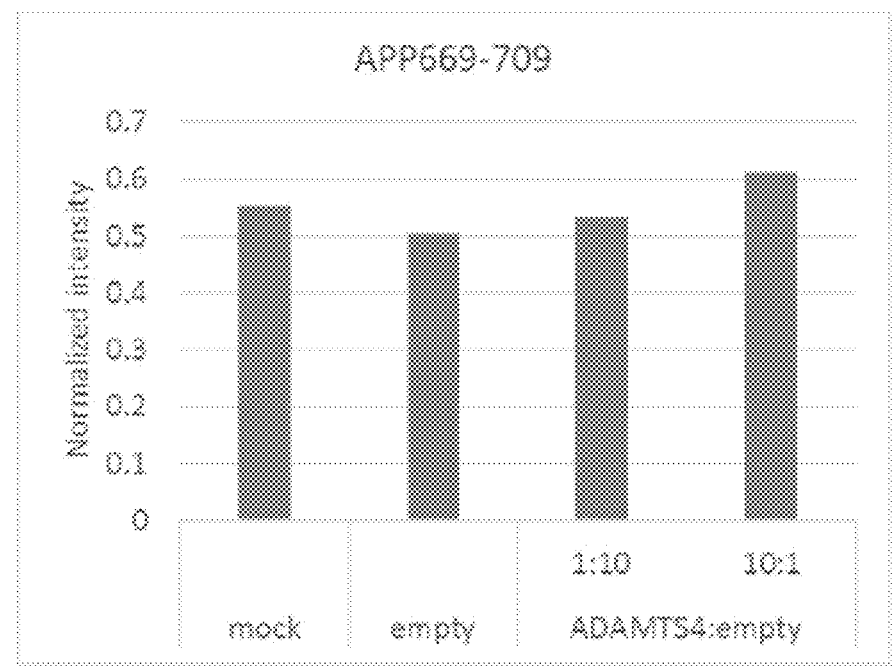
FIG. 8 is a graph demonstrating a production amount of APP669-709 obtained in Example 2.
Figure 9:
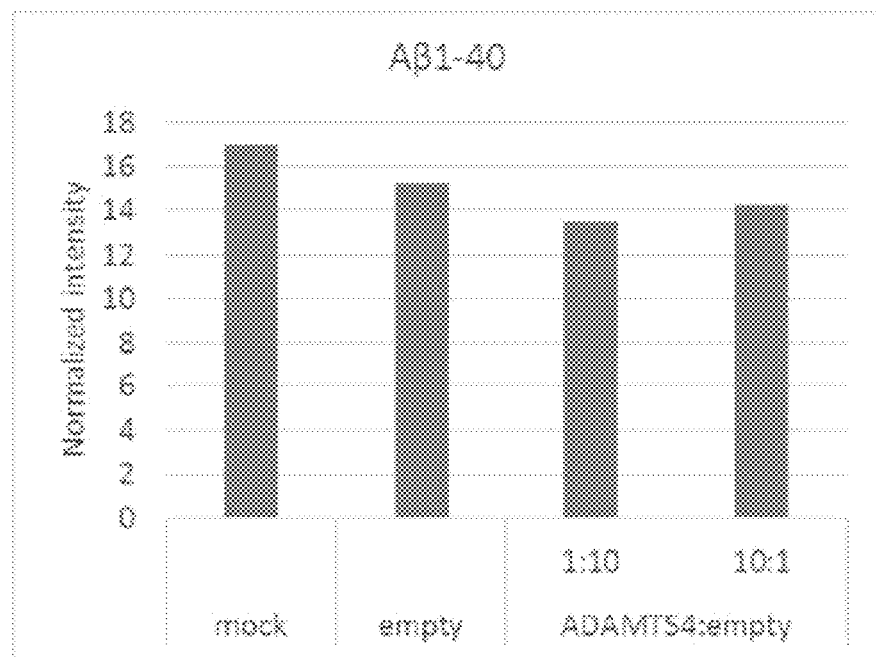
FIG. 9 is a graph demonstrating a production amount of Aβ1-40 obtained in Example 2.
Figure 10:
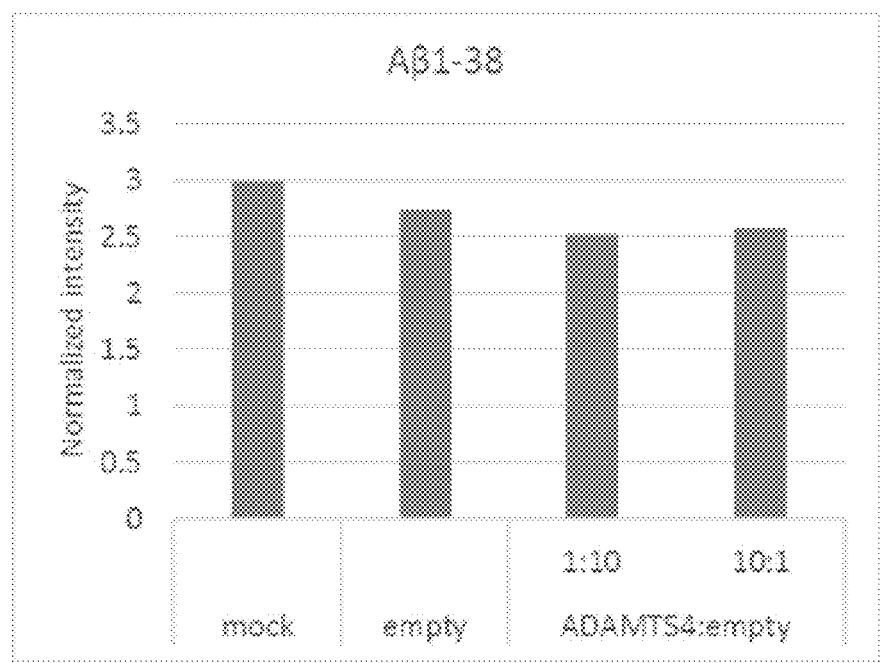
FIG. 10 is a graph demonstrating a production amount of Aβ1-38 obtained in Example 2.

Results are shown in FIGS. 7 to 10. Each of FIGS. 7 to 10 is a graph demonstrating a production amount of the A3-related peptide in a culture supernatant obtained when the ADAMTS4 plasmid vector and the empty pcDNA3.1 hygro+ vector were co-transfected into APP stable HEK in a ratio of 1.10 or 10.1, and a cell not transfected with the vectors (mock) and a cell transfected with the empty pcDNA3.1 hygro+ vector alone (empty) were used as controls. The ordinate indicates an average of normalized intensities. FIG. 7 is a graph demonstrating the production amount of APP669-711, FIG. 8 is a graph demonstrating the production amount of APP669-709, FIG. 9 is a graph demonstrating the production amount of Aβ1-40, and FIG. 10 is a graph demonstrating the production amount of Aβ1-38.

In a cell where ADAMTS4 was overexpressed by co-transfecting the ADAMTS4 plasmid vector and the empty pcDNA3.1 hygro+ vector in a ratio of 10:1, the production amounts of APP669-711 (Aβ(−3-40)) and APP669-709 (Aβ(−3-38)) tended to be rather slightly increased (FIGS. 7 and 8). On the other hand, the production amounts of Aβ1-40 which has the N-terminal side different from and the C-terminal side the same as APP669-711 (Aβ(−3-40)), and Aβ1-38 which has the N-terminal side different from and the C-terminal side the same as APP669-709 (Aβ(−3-38)), were not increased but tended to be rather slightly decreased (FIGS. 9 and 10). The result that a peptide having APP669 at the N-terminal is increased by overexpression of ADAMTS4 supports that ADMATS4 is involved in APP669 cleavage (on the N-terminal side).

Example 3: Evaluation of Inactive ADAMTS4 (E362A)

Influences of overexpression of ADAMTS4 and inactive ADAMTS4 (E362A) on the production of APP669-x were compared.

ADAMTS4_E362A is an inactive mutant obtained by substituting, with alanine (A), the 362th glutamic acid (E) in the amino acid sequence corresponding to the active center of ADAMTS4. Therefore, PCR was performed to create an ADAMTS4_E362A vector.

Primers Used in Creating E362A Mutant:

5'-cactgctgctcatgcgctgggtcatgtct-3' (SEQ ID NO: 20)

3'-gtgacgacgagtacgcgacccagtacaga-5' (namely, 5'-agacatgacccagcgcatgagcagcagtg-3': SEQ ID NO: 21)

An empty vector obtained by inserting EGFP into the pcDNA3.1 hygro+ vector (EGFP vector), the ADAMTS4 vector, or the ADAMTS4_E362A vector were co-transfected, together with a human APP vector, into HEK cell. The EGFP vector was used as a control. A mock cell transfected with nothing was also used as a control. After incubation for 96 hours, the resultant culture supernatant was collected, and subjected to measurement by IP-MS similar to that of Example 1.

Figure 11:
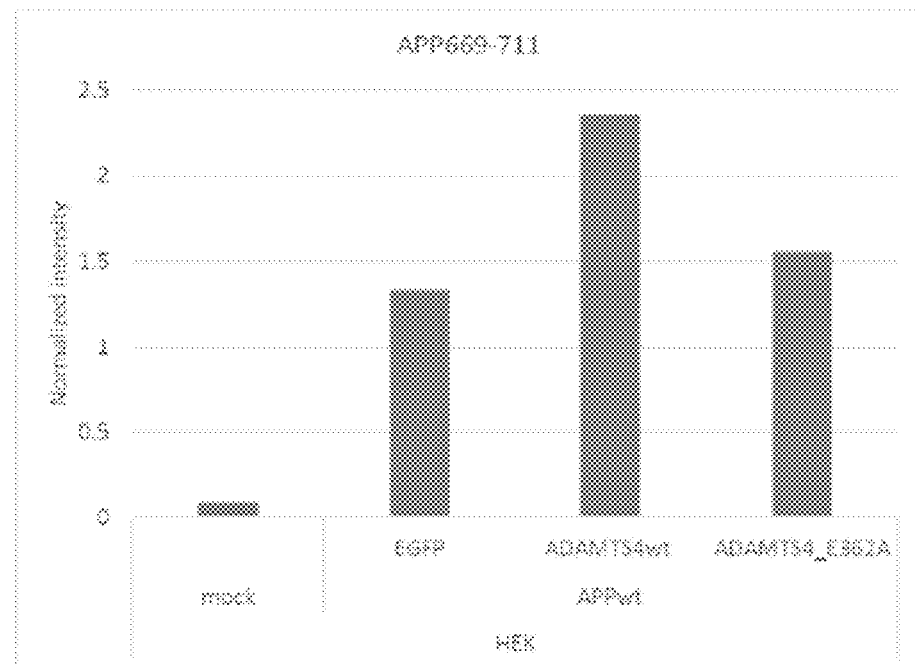
FIG. 11 is a graph demonstrating a production amount of APP669-711 in a culture supernatant obtained when EGFP. ADAMTS4 and inactive ADAMTS4_E362A are co-transfected together with human APP into HEK cells in Example 3. The ordinate indicates an average of normalized intensities.
Figure 12:
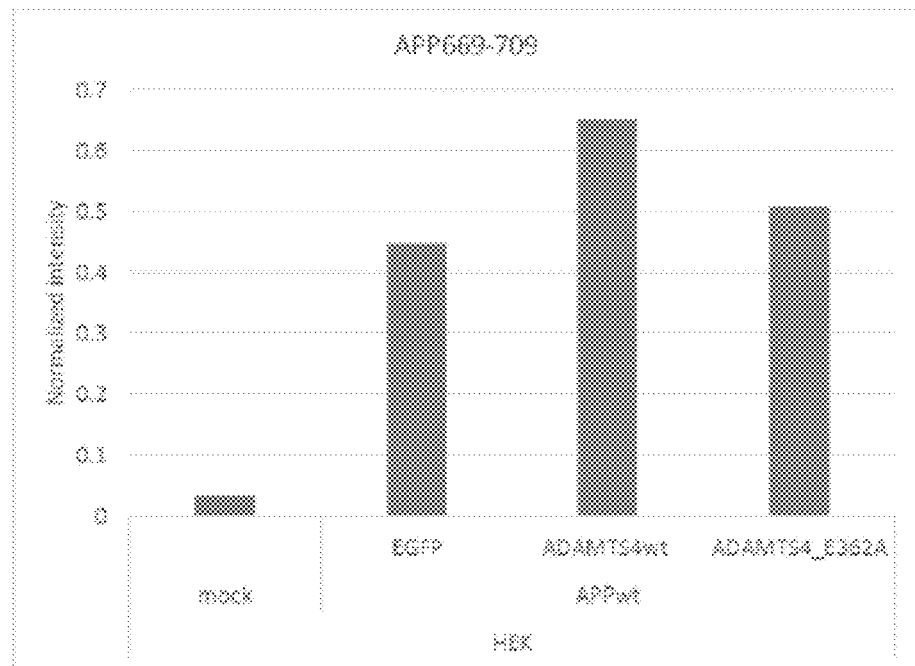
FIG. 12 is a graph demonstrating a production amount of APP669-709 obtained in Example 3.
Figure 13:
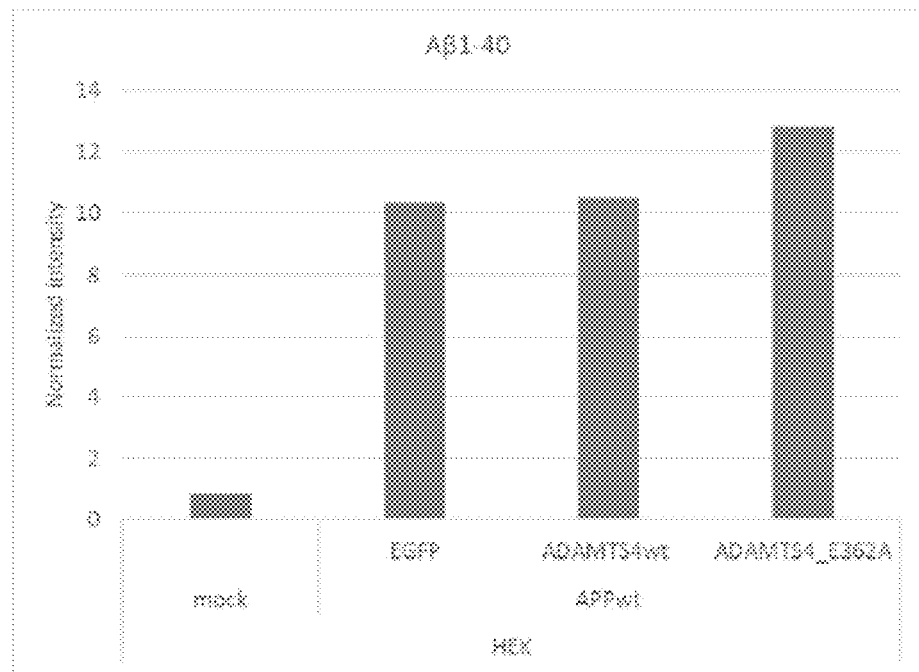
FIG. 13 is a graph demonstrating a production amount of Aβ 1-40 obtained in Example 3.
Figure 14:
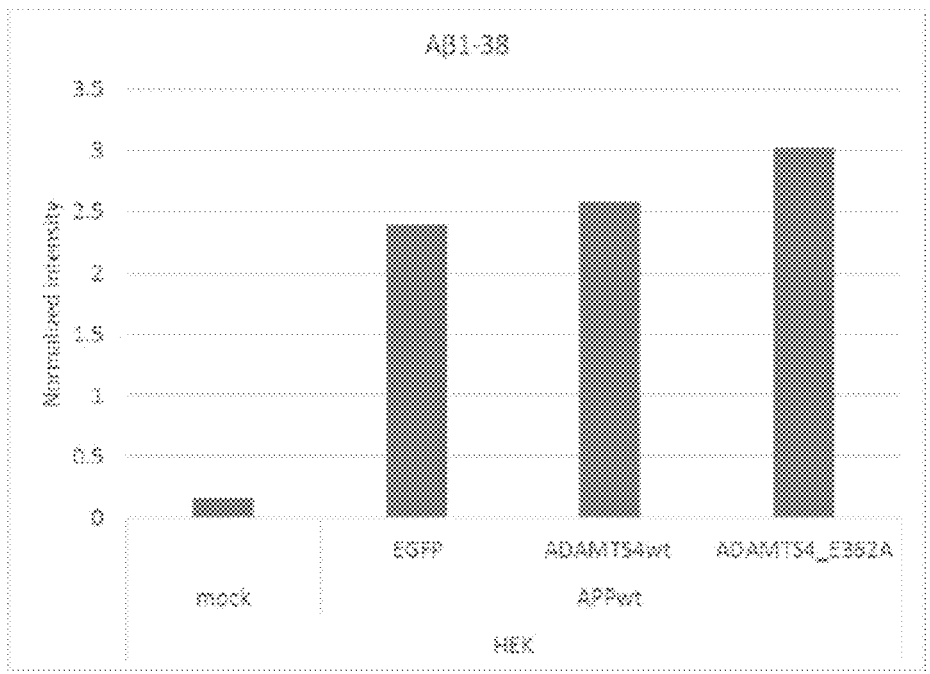
FIG. 14 is a graph demonstrating a production amount of Aβ1-38 obtained in Example 3.

Results are shown in FIGS. 11 to 14. Each of FIGS. 11 to 14 is a graph demonstrating a production amount of the A1-related peptide in a culture supernatant obtained when EGFP, ADAMTS4 or inactive ADAMTS4_E362A was co-transfected together with human APP into HEK cell. The ordinate indicates an average of normalized intensities FIG. 11 is a graph demonstrating the production amount of APP669-711, FIG. 12 is a graph demonstrating the production amount of APP669-709, FIG. 13 is a graph demonstrating the production amount of Aβ1-40, and FIG. 14 is a graph demonstrating the production amount of Aβ1-38.

In the cells in which ADAMTS4 was overexpressed by transfecting the ADAMTS4 plasmid vector, the production amounts of APP669-711 (Aβ(3-40)) and APP669-709 (Aβ(−3-38)) tended to be increased in the same manner as in Example 2 (FIGS. 11 and 12). On the other hand, the production amounts of Aβ1-40 and Aβ1-38 were not changed. In the cells in which the inactive ADAMTS4_E362A was overexpressed, the production amounts of APP669-711 (Aβ(−3-40)) and APP669-709 (Aβ(−3-38)) were equivalent to those obtained in the control cells in which EGFP was overexpressed.

Comprehensively considering these results and the results of Examples 1 and 2, ADAMTS4 is regarded as one of APP669 cleavage (on the N-terminal side) enzymes. Besides, since the production amount of APP669-x was affected by the activity or inactivity of ADAMTS4 as shown in Example 3, it is considered that change of APP669 cleavage activity including ADAMTS4 can be grasped by measuring the production amount of APP669-x, and that the measurement can be used for screening a substance that controls APP669 cleavage activity.

Example 4: Evaluation of Compound Controlling APP669 Cleavage Activity

An influence of a metalloprotease inhibitor on the production of APP669-x was evaluated.

A metalloprotease inhibitor, 25 μM GM6001 (Cosmobio) or 10 μM INCB3619 (NPL 8), was caused to act on, or DMSO was added as a control to human neuroblastoma BE(2)-C and adenocarcinomic human alveolar basal epithelial cell A549, and the resultant cells were incubated for 96 hours. Thereafter, a culture supernatant was collected, and subjected to the measurement by IP-MS similar to that of Example 1. As the internal standard peptide, however, 20 pM stable isotope labeled Aβ1-38 and 100 μM stable isotope labeled A31-15 were used.

Figure 15:
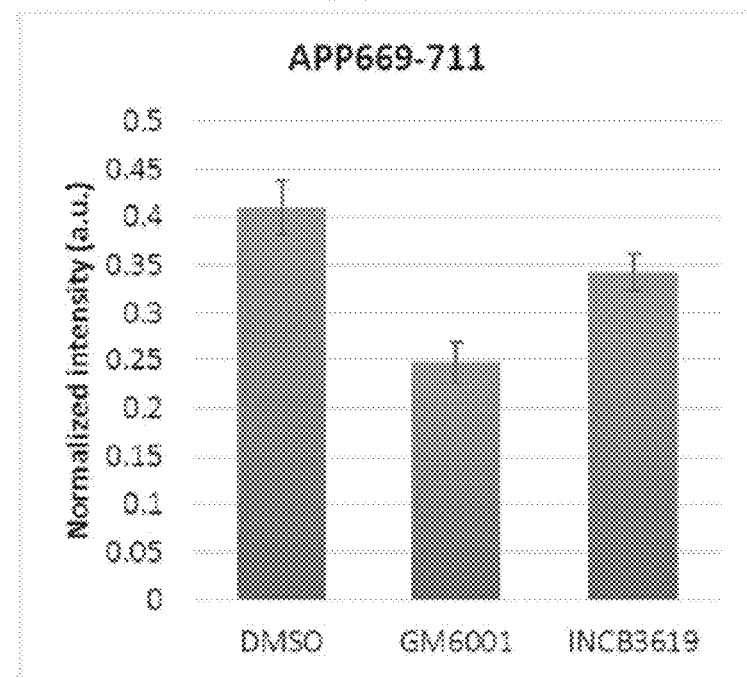
FIG. 15 is a graph demonstrating a production amount of APP669-711 in a culture supernatant obtained when 25 μM GM6001 or 10 μM INCB3619 is caused to act on BE(2)-C cell in Example 4. The ordinate indicates an average of normalized intensities.
Figure 16:
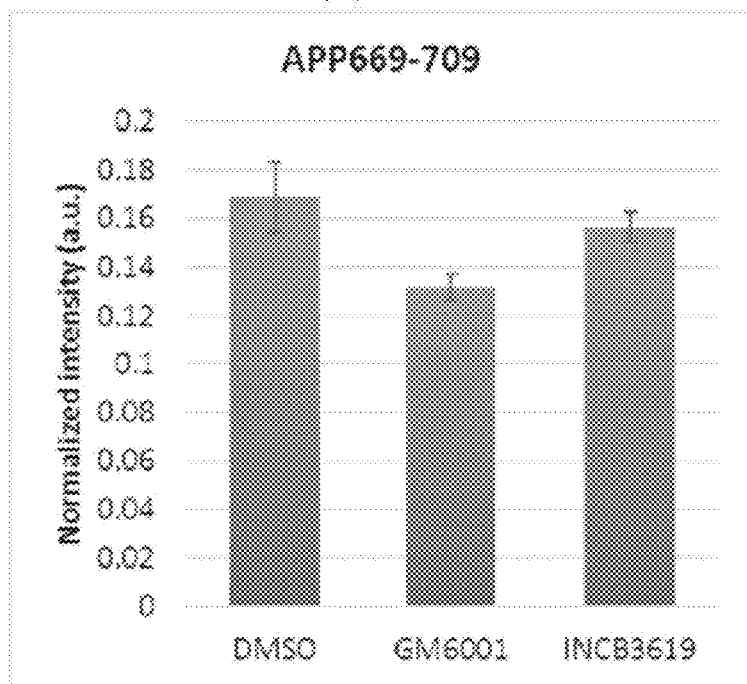
FIG. 16 is a graph demonstrating a production amount of APP669-709 obtained in BE(2)-C cell in Example 4.
Figure 17:
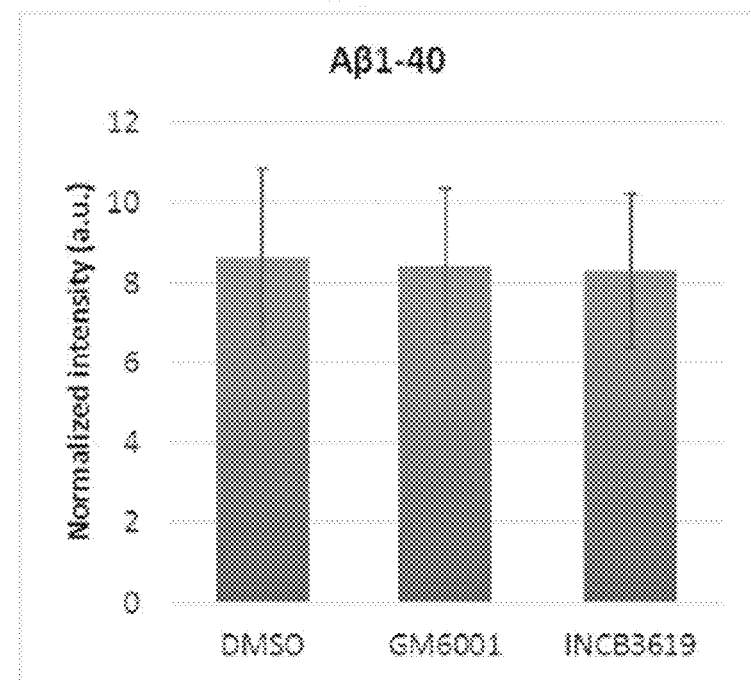
FIG. 17 is a graph demonstrating a production amount of Aβ1-40 obtained in BE(2)-C cell in Example 4.
Figure 18:
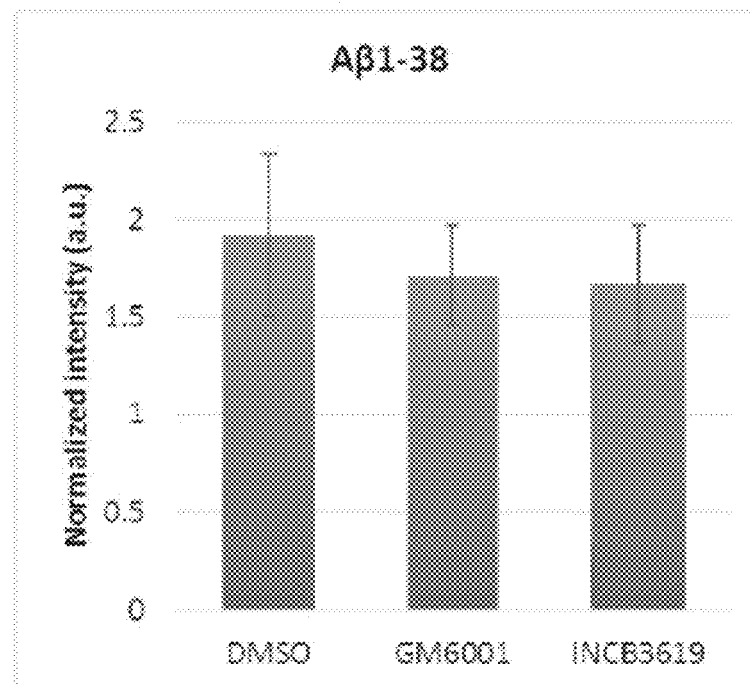
FIG. 18 is a graph demonstrating a production amount of Aβ1-38 obtained in BE(2)-C cell in Example 4.

Results obtained in BE(2)-C cells are shown in FIGS. 15 to 18. Each of FIGS. 15 to 18 is a graph demonstrating a production amount of the Aβ-related peptide in a culture supernatant obtained when 25 μm GM6001 or 10 μM INCB3619 was caused to act on BE(2)-C cells. The ordinate indicates an average of normalized intensities FIG. 15 is a graph demonstrating the production amount of APP669-711, FIG. 16 is a graph demonstrating the production amount of APP669-709, FIG. 17 is a graph demonstrating the production amount of Aβ1-40, and FIG. 18 is a graph demonstrating the production amount of Aβ1-38.

Figure 19:
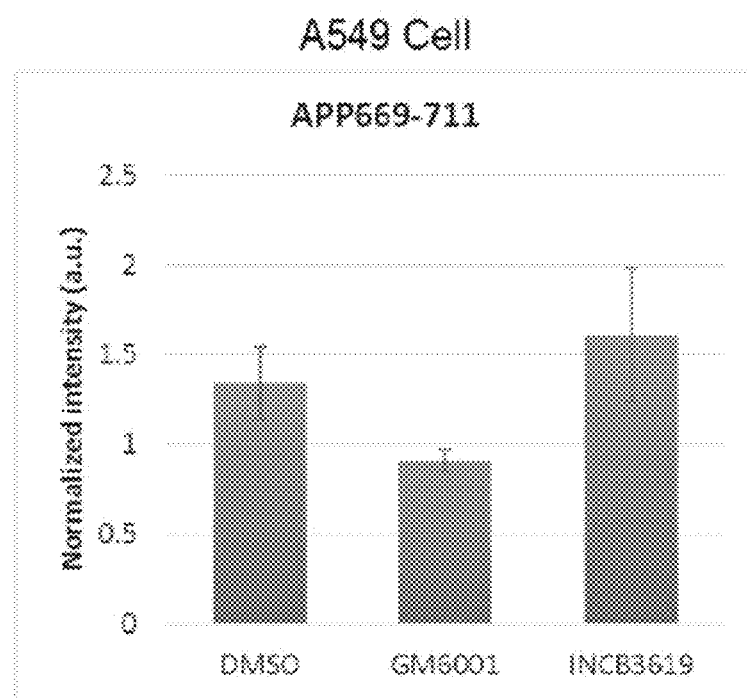
FIG. 19 is a graph demonstrating a production amount of APP669-711 in a culture supernatant obtained when 25 μM GM6001 or 10 μM INCB3619 is caused to act on A549 cell in Example 4. The ordinate indicates an average of normalized intensities.
Figure 20:
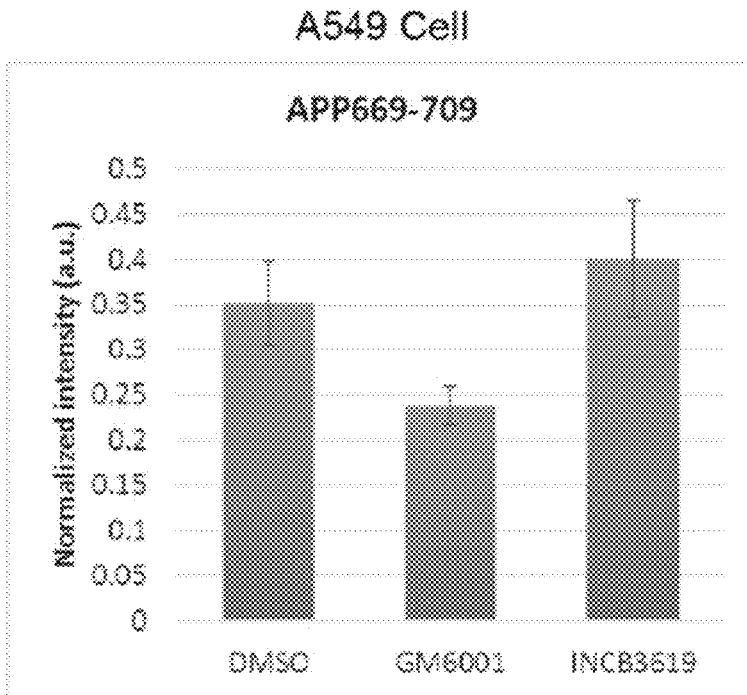
FIG. 20 is a graph demonstrating a production amount of APP669-709 obtained in Example 4.
Figure 21:
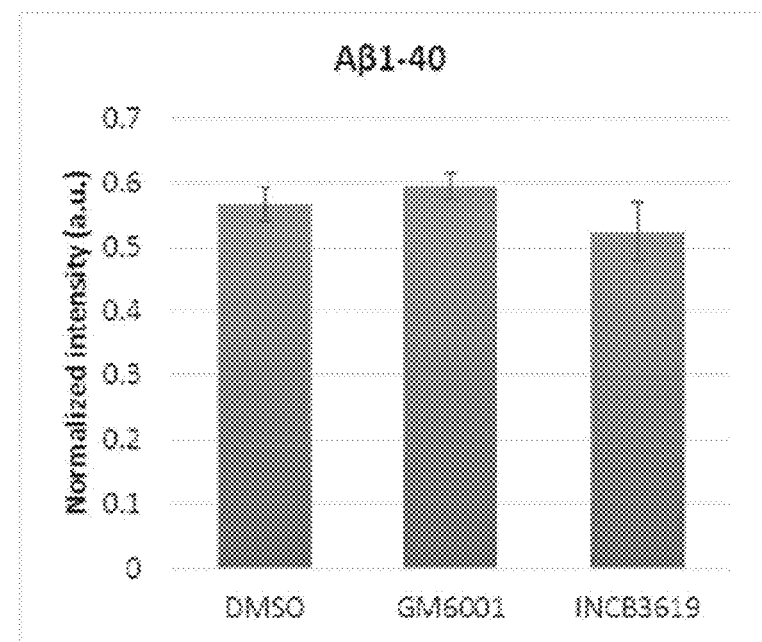
FIG. 21 is a graph demonstrating a production amount of Aβ1-40 obtained in Example 4.
Figure 22:
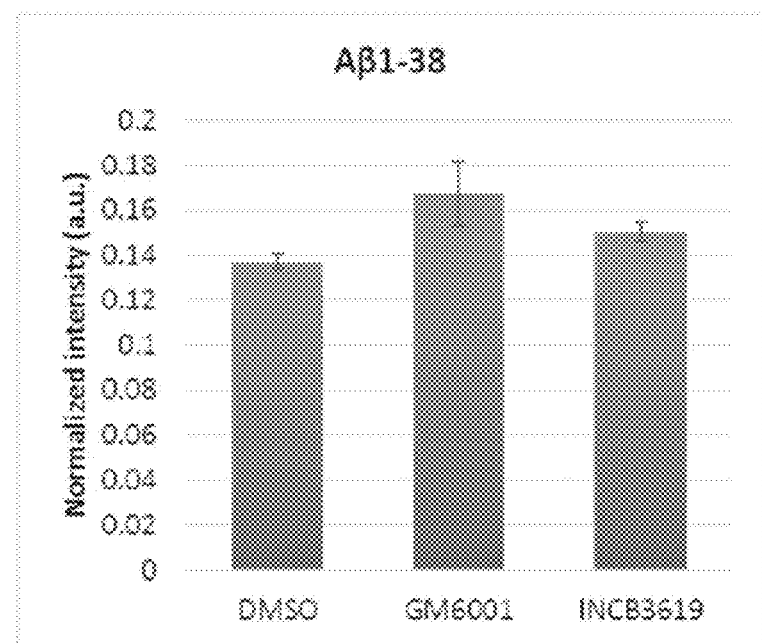
FIG. 22 is a graph demonstrating a production amount of Aβ1-38 obtained in Example 4.

Results obtained in A549 cells are shown in FIGS. 19 to 22. Each of FIGS. 19 to 22 is a graph demonstrating a production amount of the Aβ-related peptide in a culture supernatant obtained when 25 μM GM6001 or 10 μM INCB3619 was caused to act on A549 cells. The ordinate indicates an average of normalized intensities. FIG. 19 is a graph demonstrating the production amount of APP669-711, FIG. 20 is a graph demonstrating the production amount of APP669-709, FIG. 21 is a graph demonstrating the production amount of Aβ1-40, and FIG. 22 is a graph demonstrating the production amount of Aβ1-38.

In either of BE(2)-C cells and A549 cells, the production amounts of APP669-711 (Aβ(−3-40)) and APP669-709 (Aβ(3-38)) were decreased by the action of GM6001, but the production amounts of Aβ1-40 and Aβ1-38 were not decreased. Based on these results, it is understood that GM6001 decreases APP669 cleavage activity (on the N-terminal side). On the other hand, regarding the influence of INCB3619, the production amounts of APP669-711 (Aβ(−3-40)) and APP669-709 (Aβ(3-38)) were rather slightly decreased in BE(2)-C cells, but were not changed in A549 cells. Based on these results, it is understood that INCB3619 has a low effect of decreasing APP669 cleavage activity (on the N-terminal side). In this manner, the influence of each compound on APP669 cleavage activity can be evaluated.

Also on APP stable HEK cells, 25 μM GM6001 was caused to act in the same manner as described above, and the measurement was performed by IP-MS.

Figure 23:
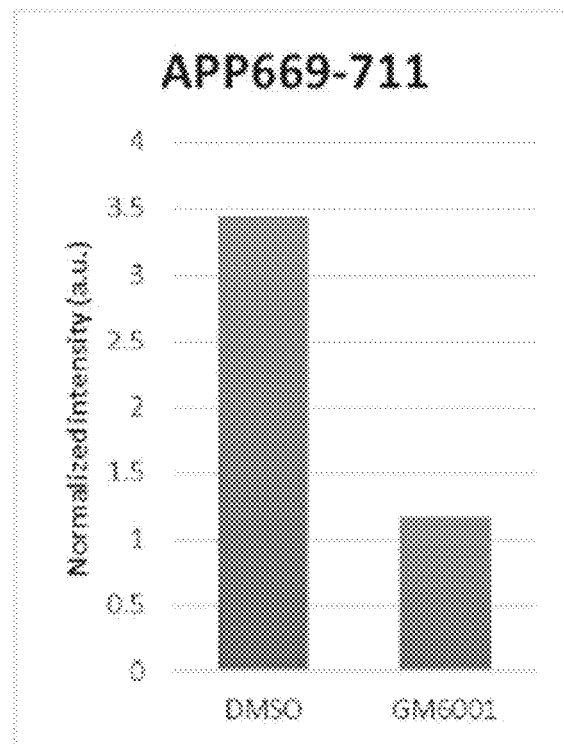
FIG. 23 is a graph demonstrating a production amount of APP669-711 in a culture supernatant obtained when 25 μM GM6001 is caused to act on APP stable HEK cell in Example 4. The ordinate indicates an average of normalized intensities.
Figure 24:
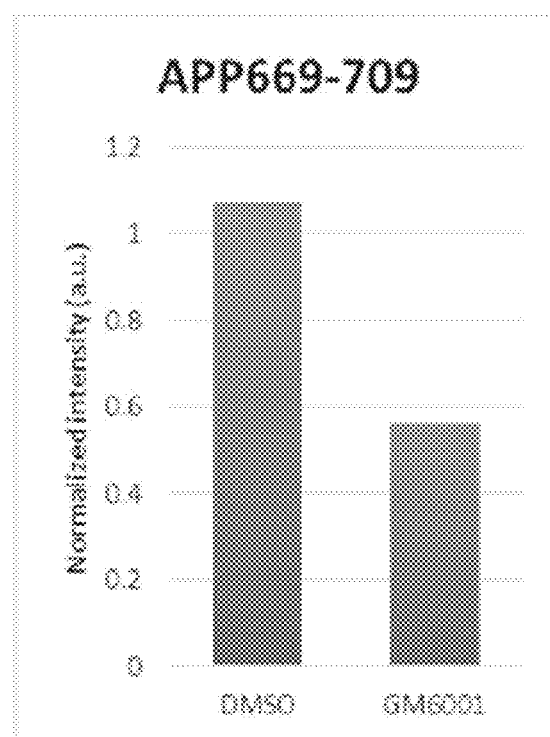
FIG. 24 is a graph demonstrating a production amount of APP669-709 obtained in Example 4.
Figure 25:
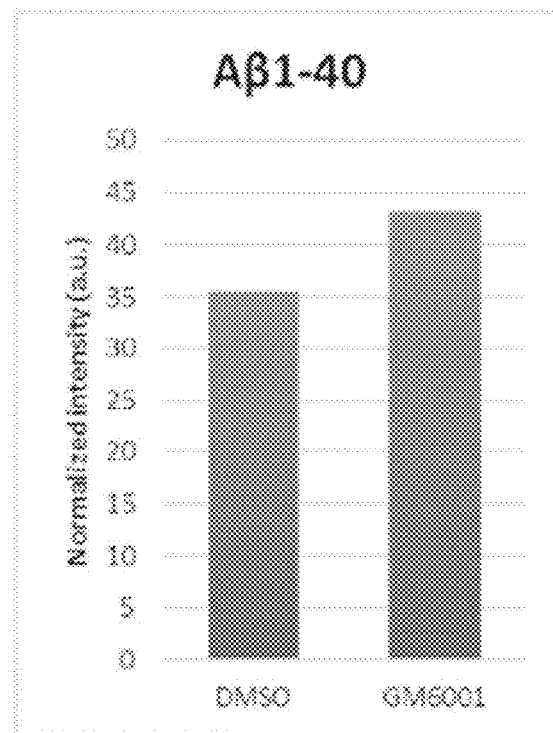
FIG. 25 is a graph demonstrating a production amount of Aβ 1-40 obtained in Example 4.
Figure 26:
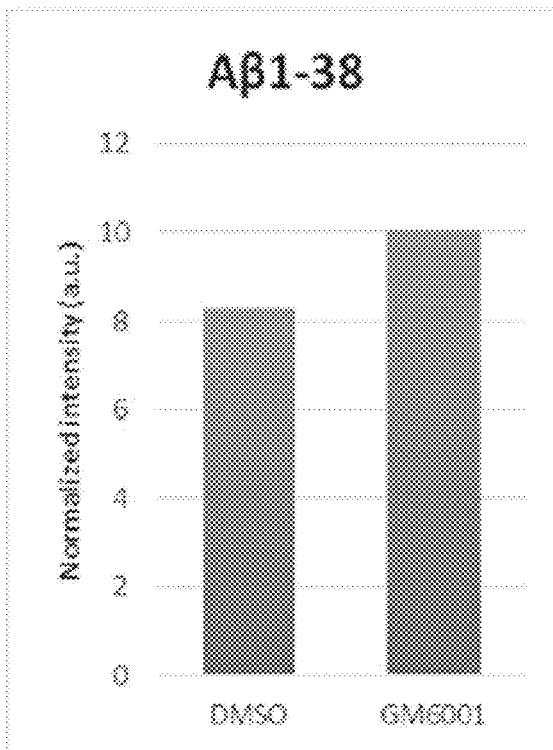
FIG. 26 is a graph demonstrating a production amount of Aβ1-38 obtained in Example 4.

Results obtained in APP stable HEK cells are shown in FIGS. 23 to 26. Each of FIGS. 23 to 26 is a graph demonstrating a production amount of the Aβ-related peptide in a culture supernatant obtained when 25 μM GM6001 was caused to act on APP stable HEK cells. The ordinate indicates an average of normalized intensities. FIG. 23 is a graph demonstrating the production amount of APP669-711, FIG. 24 is a graph demonstrating the production amount of APP669-709, FIG. 25 is a graph demonstrating the production amount of A1-40, and FIG. 26 is a graph demonstrating the production amount of Aβ1-38.

Also in APP stable HEK cells, the production amounts of APP669-711 (Aβ(−3-40)) and APP669-709 (Aβ(3-38)) were decreased by the action of GM6001, but the production amounts of Aβ1-40 and Aβ1-38 were not decreased.

Example 5: Evaluation by MT-MMP Transfection into APP Stable HEK Cells

An influence of a metalloprotease, MT-MMP1, 2, 3, 4, 5 or 6, on the production of APP669-x was evaluated.

Expression vectors obtained by inserting, into mammalian cell expression vector pCEP4, FLAG tagged human MT-MMP1, MT-MMP2, MT-MMP3, MT-MMP4, MT-MMP5 and MT-MMP6 were donated by Specially Appointed Guest Professor Motoharu Seiki (Kanazawa University).

A vector of MT-MMP1, 2, 3, 4, 5 or 6 was transfected into APP stable HEK cells, and after 96 hours, a culture supernatant was collected, and subjected to the measurement by IPMS similar to that of Example 1. As a control, a cell (mock) not transfected with the vector was used.

Figure 27:
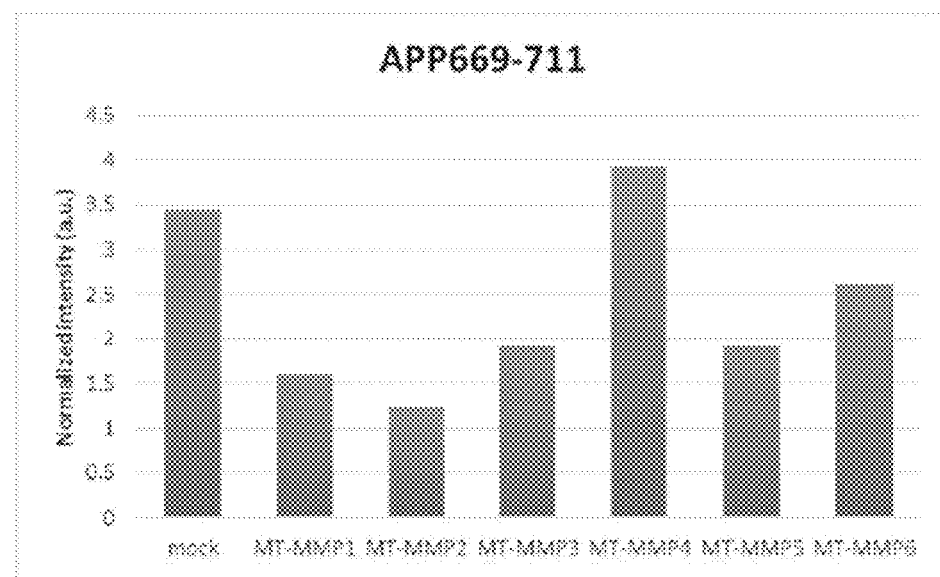
FIG. 27 is a graph demonstrating a production amount of APP669-711 in a culture supernatant obtained when a vector of MT-MMP1, 2, 3, 4, 5 or 6 is transfected into APP stable HEK cell in Example 5. The ordinate indicates an average of normalized intensities.
Figure 28:
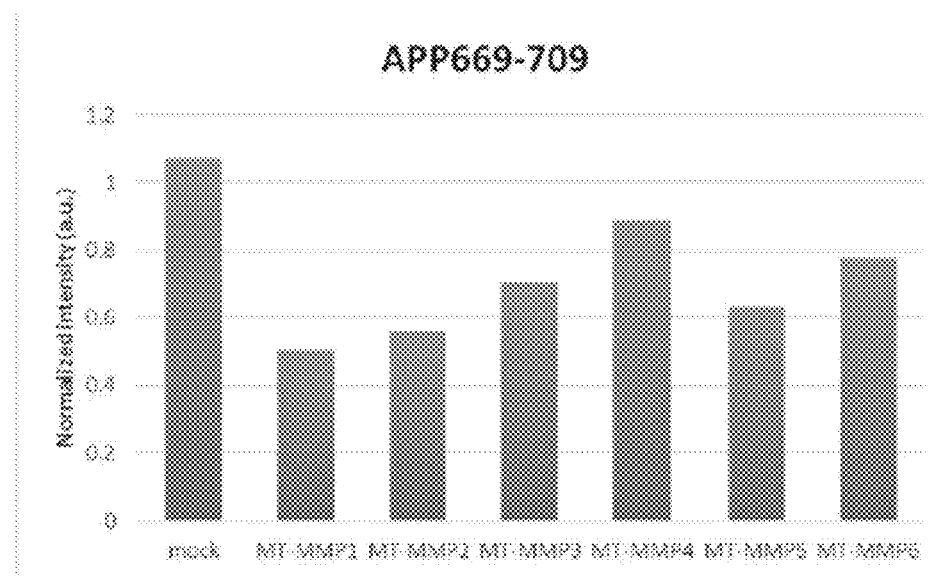
FIG. 28 is a graph demonstrating a production amount of APP669-709 obtained in Example 5.
Figure 29:
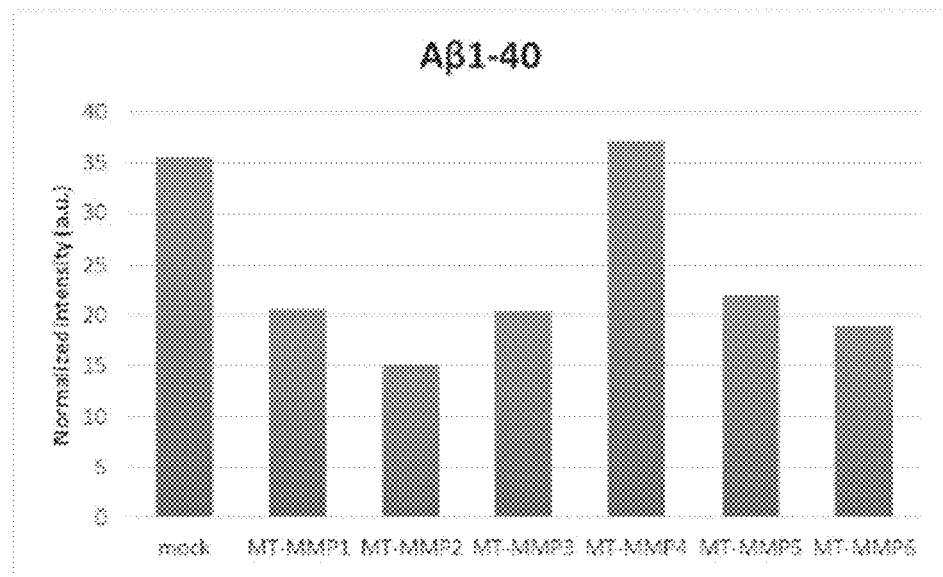
FIG. 29 is a graph demonstrating a production amount of Aβ1-40 obtained in Example 5.
Figure 30:
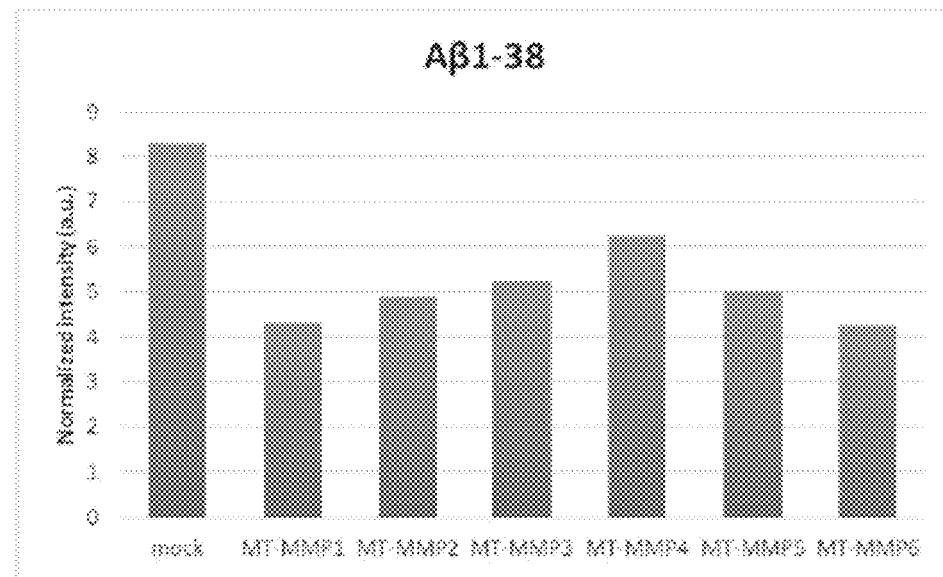
FIG. 30 is a graph demonstrating a production amount of Aβ1-38 obtained in Example 5.

Results are shown in FIGS. 27 to 30. Each of FIGS. 27 to 30 is a graph demonstrating a production amount of the Aβ-related peptide in a culture supernatant obtained when the vector of MT-MMP1, 2, 3, 4, 5 or 6 was transfected into APP stable HEK cells. The ordinate indicates an average of normalized intensities. FIG. 27 is a graph demonstrating the production amount of APP669-711, FIG. 28 is a graph demonstrating the production amount of APP669-709, FIG. 29 is a graph demonstrating the production amount of A31-40, and FIG. 30 is a graph demonstrating the production amount of Aβ1-38.

In the cells transfected with MT-MMP1, 2, 3, 5 or 6, the production amounts of both APP669-711 (Aβ(−3-40)) and APP669-709 (Aβ(3-38)) were decreased. On the other hand, the production amounts of Aβ-40 and Aβ1-38 which are different in the N-terminal side and the same in the C-terminal side, were similarly decreased. It is reported that MT-MMP2 and 3 degrade Aβ (NPL 9). Accordingly, it is presumed that MT-MMP1, 2, 3, 5 or 6 degraded not only APP669-x but also Aβ1-x, and hence, the production amounts of these Aβ-related peptides were decreased. In this manner, when cleavage is caused in a position different from position APP669, it is found that Aβ1-x is also similarly changed. Accordingly, it is effective to refer also to change of Aβ1-x for determination whether APP669 cleavage activity is changed or other cleavage activity is changed.

Example 6: Evaluation of β Site Cleavage by Transfection with APP, c102 and c99

It was evaluated whether or not β site cleavage was caused by β-secretase (BACE1) in c102 resulting from APP669 cleavage.

c102 is a protein having APP669 at the N-terminal and having the C-terminal of APP at the C-terminal, and is a protein obtained at the C-terminal side after APP669 cleavage. c99 is a protein obtained at the C-terminal side after β site cleavage (referring to FIG. 1, β-CTF).

As a vector for expressing c99 inserted into a membrane, a vector in which a cDNA encoding SPA4CT having two amino acids (DA) added after APP signal sequence (NPL 10) was used (NPL 11). A vector for expressing c102 having three amino acids (VKM) added before c99 sequence in this vector was constructed by PCR. Full length APP, c102 or c99 was transfected into HEK cells. As a control, untransfected HEK cells (no) were also evaluated. After 96 hours, a culture supernatant was collected, and subjected to the measurement by IP-MS similar to that of Example 1. As the internal standard peptide, however, 20 μM stable isotope labeled Aβ1-38 and 100 μM stable isotope labeled Aβ1-15 were used.

Figure 31:
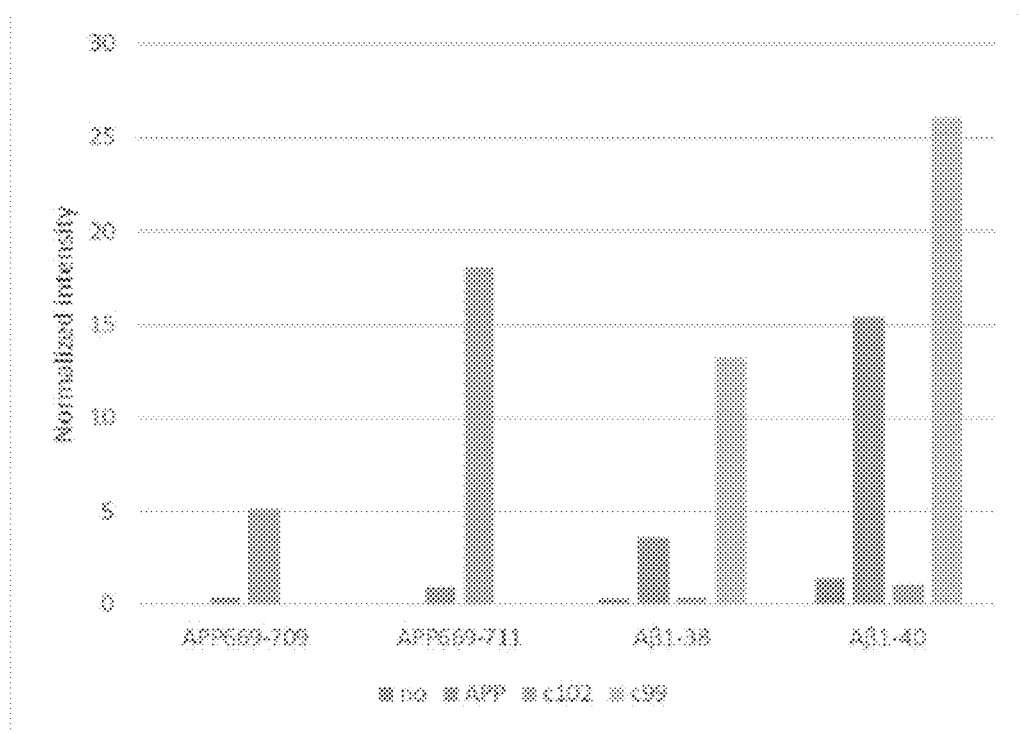
FIG. 31 is a graph demonstrating production amounts of Aβ-related peptides (APP669-709, APP669-711. Aβ31-38, and Aβ1-40) in a culture supernatant obtained when full length APP, c102 or c99 is transfected into HEK cells in Example 6. The ordinate indicates an average of normalized intensities.

Results are shown in FIG. 31. FIG. 31 is a graph demonstrating production amounts of Aβ-related peptides (APP669-709, APP669-711. Aβ1-38 and Aβ-40) in a culture supernatant obtained when full length APP, c102, or c99 was transfected into HEK cells. The ordinate indicates an average of normalized intensities. With respect to the Aβ-related peptides, the results obtained from the control (no), transfection with full length APP, transfection with c102, and transfection with c99 are shown in this order from the left. The production amount of APP669-709 was too small in the control (no) and in using c99 to be shown as a bar graph. The production amount of APP669-711 was too small in the control (no) and in using c99 to be shown as a bar graph.

When c102 was overexpressed, the production amounts of APP669-711 (Aβ(−3-40)) and APP669-709 (Aβ(3-38)) were the largest, and when c99 was overexpressed, the production amounts of Aβ1-40 and Aβ1-38 were largest. When full length APP was overexpressed, all the Aβ-related peptides were increased as compared with those in the control cells. This reveals that APP669-711, APP669-709, Aβ-40 and Aβ1-38 are produced from overexpressed full length APP. When c102 was overexpressed, however, Aβ1-40 and Aβ1-38 were not increased as compared with those in the control cells. In other words, β site cleavage is not caused in c102 resulting from APP669 cleavage (on the N-terminal side). These results reveal that the production of Aβ1-x including Aβ1-40 and Aβ1-42 can be inhibited if APP669 cleavage activity can be accelerated.

(1)
A method for screening a substance that controls APP669 1N-terminal cleavage activity, comprising: causing a candidate substance to act on a cultured cell; measuring an Aβ-related peptide produced from the cultured cell; and evaluating APP669 N-terminal cleavage activity.

(2)
The method according to (1) described above, in which the Aβ-related peptide is APP669-x.

(3)
The method according to (2) described above, in which in the evaluation of APP669 N-terminal cleavage activity, an amount of APP669-x in a control cell on which the candidate substance is not caused to act is used as a reference level, and when an amount of APP669-x in a cell on which the candidate substance is caused to act is higher than the reference level, it is determined that APP669 N-terminal cleavage activity is increased, and when the amount of APP669-x in the cell on which the candidate substance is caused to act is lower than the reference level, it is determined that APP669 N-terminal cleavage activity is decreased.

(4)
The method according to (1) described above, in which the Aβ-related peptide is APP669-x, and an Aβ-related peptide other than APP669-x.

(5)
The method according to (4) described above, in which in the evaluation of APP669 N-terminal cleavage activity, amounts of APP669-x and the Aβ-related peptide other than APP669-x in a control cell on which the candidate substance is not caused to act are used as reference levels, and when an amount of APP669-x is higher than the reference level and an amount of the Aβ-related peptide other than APP669-x is equivalent to or lower than the reference level in a cell on which the candidate substance is caused to act, it is determined that APP669 N-terminal cleavage activity is increased, and when the amount of APP669-x is lower than the reference level and the amount of the Aβ-related peptide other than APP669-x is equivalent to or higher than the reference level in the cell on which the candidate substance is caused to act, it is determined that APP669 N-terminal cleavage activity is decreased.

(6)
The method according to (4) or (5) described above, in which the Aβ-related peptide other than APP669-x is Aβ1-y, wherein y=x−671.

(7)
The method according to any one of (1) to (6) described above, in which the candidate substance is selected from the group consisting of a low molecular weight compound, a peptide, a protein, and a nucleic acid.

(8)
The method according to any one of (1) to (7) described above, in which the candidate substance is selected from the group consisting of a low molecular weight compound, a peptide, a protein, and a nucleic acid designed to target ADAMTS4.

(9)
A method for screening a substance that controls APP669 N-terminal cleavage activity, including causing, in an in vitro system, ADAMTS4 to act on full length APP or an APP fragment containing a sequence including APP669 and the neighboring residues in the presence of a candidate substance, measuring an APP669-x produced from the full length APP or the APP fragment containing the sequence including APP669 and the neighboring residues; and evaluating APP669 N-terminal cleavage activity.

(10)
The method according to (9) described above, in which in the evaluation of APP669 N-terminal cleavage activity, an amount of APP669-x in a control system in which the candidate substance is not present is used as a reference level, and when an amount of APP669-x in a system in which the candidate substance is present is higher than the reference level, it is determined that APP669 N-terminal cleavage activity is increased, and when the amount of APP669-x in the system in which the candidate substance is present is lower than the reference level, it is determined that APP669 N-terminal cleavage activity is decreased.

(11)
The method according to (9) or (10) described above, in which the candidate substance is selected from the group consisting of a low molecular weight compound, a peptide, a protein, and a nucleic acid.

(12)
An APP669 N-terminal cleavage agent, comprising ADAMTS4.

(13)
A method for using ADAMTS4 as an APP669 N-terminal cleavage agent in an in vitro system.

(14)
Use of ADAMTS4 as an APP669 N-terminal cleavage agent in an in vitro system.

The invention claimed is:

1. A method for screening a compound that controls APP669 N-terminal cleavage activity of ADAMTS4, the method comprising:
   contacting a compound with a cultured cell;
   measuring an amount of at least one Aβ-related peptide produced from the cultured cell, wherein the at least one Aβ-related peptide comprises APP669-x, where x represents an integer larger than 669 and up to 770; and
   evaluating the APP669 N-terminal cleavage activity of ADAMTS4 controlled by the compound in the cultured cell,
   wherein in the evaluation of the APP669 N-terminal cleavage activity,
   an amount of APP669-x in a control cell in which the compound is not contacted is used as a reference level, and
   when an amount of APP669-x in a cell in which the compound is contacted is higher than the reference level, it is determined that the APP669 N-terminal cleavage activity is increased, and
   when the amount of APP669-x in the cell on which the compound is contacted is lower than the reference level, it is determined that the APP669 N-terminal cleavage activity is decreased.

2. The method according to claim 1, wherein the at least one Aβ-related peptide comprises APP669-x and an Aβ-related peptide other than APP669-x.

3. The method according to claim 2, wherein in the evaluation of the APP669 N-terminal cleavage activity,
   amounts of APP669-x and the Aβ-related peptide other than APP669-x in a control cell in which the compound is contacted are used as reference levels, and
   when an amount of APP669-x is higher than the reference level and an amount of the Aβ-related peptide other than APP669-x is equivalent to or lower than the reference level in a cell in which the compound is contacted, it is determined that the APP669 N-terminal cleavage activity is increased, and
   when the amount of APP669-x is lower than the reference level and the amount of the Aβ-related peptide other than APP669-x is equivalent to or higher than the reference level in the cell in which the compound is contacted, it is determined that the APP669 N-terminal cleavage activity is decreased.

4. The method according to claim 2, wherein the Aβ-related peptide other than APP669-x is Aβ1-y, wherein y=x−671.

5. A method for screening a compound that controls APP669 N-terminal cleavage activity, comprising:
   causing, in an in vitro system, ADAMTS4 to act on full length APP or an APP fragment containing a sequence including APP669 and the neighboring residues in the presence of a compound;
   measuring an APP669-x produced from the full length APP or the APP fragment containing the sequence including APP669 and the neighboring residues; and
   evaluating the APP669 N-terminal cleavage activity.

6. The method according to claim 5, wherein in the evaluation of the APP669 N-terminal cleavage activity,
   an amount of APP669-x in a control system in which the compound is not present is used as a reference level, and
   when an amount of APP669-x in a system in which the compound is present is higher than the reference level, it is determined that the APP669 N-terminal cleavage activity is increased, and
   when the amount of APP669-x in the system in which the compound is present is lower than the reference level, it is determined that the APP669 N-terminal cleavage activity is decreased.

7. The method according to claim 5, wherein the compound is selected from the group consisting of a low molecular weight compound, a peptide, a protein, and a nucleic acid.

8. An APP669 N-terminal cleavage agent, comprising ADAMTS4.

* * * * *

SEQUENCE LISTING

<160> NUMBER OF SEQ ID NOS: 21

<210> SEQ ID NO 1
<211> LENGTH: 38
<212> TYPE: PRT
<213> ORGANISM: Homo sapiens

<400> SEQUENCE: 1

-continued

Asp Ala Glu Phe Arg His Asp Ser Gly Tyr Glu Val His His Gln Lys
1               5                   10                  15

Leu Val Phe Phe Ala Glu Asp Val Gly Ser Asn Lys Gly Ala Ile Ile
            20                  25                  30

Gly Leu Met Val Gly Gly
        35

<210> SEQ ID NO 2
<211> LENGTH: 40
<212> TYPE: PRT
<213> ORGANISM: Homo sapiens

<400> SEQUENCE: 2

Asp Ala Glu Phe Arg His Asp Ser Gly Tyr Glu Val His His Gln Lys
1               5                   10                  15

Leu Val Phe Phe Ala Glu Asp Val Gly Ser Asn Lys Gly Ala Ile Ile
            20                  25                  30

Gly Leu Met Val Gly Gly Val Val
        35                  40

<210> SEQ ID NO 3
<211> LENGTH: 41
<212> TYPE: PRT
<213> ORGANISM: Homo sapiens

<400> SEQUENCE: 3

Val Lys Met Asp Ala Glu Phe Arg His Asp Ser Gly Tyr Glu Val His
1               5                   10                  15

His Gln Lys Leu Val Phe Phe Ala Glu Asp Val Gly Ser Asn Lys Gly
            20                  25                  30

Ala Ile Ile Gly Leu Met Val Gly Gly
        35                  40

<210> SEQ ID NO 4
<211> LENGTH: 43
<212> TYPE: PRT
<213> ORGANISM: Homo sapiens

<400> SEQUENCE: 4

Val Lys Met Asp Ala Glu Phe Arg His Asp Ser Gly Tyr Glu Val His
1               5                   10                  15

His Gln Lys Leu Val Phe Phe Ala Glu Asp Val Gly Ser Asn Lys Gly
            20                  25                  30

Ala Ile Ile Gly Leu Met Val Gly Gly Val Val
        35                  40

<210> SEQ ID NO 5
<211> LENGTH: 42
<212> TYPE: PRT
<213> ORGANISM: Homo sapiens

<400> SEQUENCE: 5

Asp Ala Glu Phe Arg His Asp Ser Gly Tyr Glu Val His His Gln Lys
1               5                   10                  15

Leu Val Phe Phe Ala Glu Asp Val Gly Ser Asn Lys Gly Ala Ile Ile
            20                  25                  30

Gly Leu Met Val Gly Gly Val Val Ile Ala
        35                  40

<210> SEQ ID NO 6

```
<211> LENGTH: 20
<212> TYPE: DNA
<213> ORGANISM: Artificial sequence
<220> FEATURE:
<223> OTHER INFORMATION: synthetic primer

<400> SEQUENCE: 6
gcgctacctg ctaacagtga                                           20

<210> SEQ ID NO 7
<211> LENGTH: 20
<212> TYPE: DNA
<213> ORGANISM: Artificial sequence
<220> FEATURE:
<223> OTHER INFORMATION: synthetic primer

<400> SEQUENCE: 7
tcactgttag caggtagcgc                                           20

<210> SEQ ID NO 8
<211> LENGTH: 20
<212> TYPE: DNA
<213> ORGANISM: Artificial sequence
<220> FEATURE:
<223> OTHER INFORMATION: synthetic primer

<400> SEQUENCE: 8
cattccacgg tgcggggcta                                           20

<210> SEQ ID NO 9
<211> LENGTH: 20
<212> TYPE: DNA
<213> ORGANISM: Artificial sequence
<220> FEATURE:
<223> OTHER INFORMATION: synthetic primer

<400> SEQUENCE: 9
tagccccgca ccgtggaatg                                           20

<210> SEQ ID NO 10
<211> LENGTH: 19
<212> TYPE: DNA
<213> ORGANISM: Artificial sequence
<220> FEATURE:
<223> OTHER INFORMATION: synthetic primer

<400> SEQUENCE: 10
agtcaggaat cccgtgggg                                            19

<210> SEQ ID NO 11
<211> LENGTH: 22
<212> TYPE: DNA
<213> ORGANISM: Artificial sequence
<220> FEATURE:
<223> OTHER INFORMATION: synthetic primer

<400> SEQUENCE: 11
tgtgtcaaag tggtcagggt cc                                        22

<210> SEQ ID NO 12
<211> LENGTH: 96
<212> TYPE: DNA
<213> ORGANISM: Homo sapiens

<400> SEQUENCE: 12
ggtggtggca gatgacaaga tggccgcatt ccacggtgcg ggctaaagc gctacctgct    60
```

```
aacagtgatg gcagcagcag ccaaggcctt caagca                                  96

<210> SEQ ID NO 13
<211> LENGTH: 80
<212> TYPE: DNA
<213> ORGANISM: Homo sapiens

<400> SEQUENCE: 13
ggtggtggca gatgacaaga tggccgcatt ccacgctacc tgctaacagt gatggcagca        60
gcagccaagg ccttcaagca                                                   80

<210> SEQ ID NO 14
<211> LENGTH: 67
<212> TYPE: DNA
<213> ORGANISM: Homo sapiens

<400> SEQUENCE: 14
ggtggtggca gatgacaaga tggccgtagc taacagtgat ggcagcagca gccaaggcct        60
tcaagca                                                                 67

<210> SEQ ID NO 15
<211> LENGTH: 76
<212> TYPE: DNA
<213> ORGANISM: Homo sapiens

<400> SEQUENCE: 15
ggtggtggca gatgacaaga tggccgcatt ccaacctgct aacagtgatg gcagcagcag        60
ccaaggcctt caagca                                                       76

<210> SEQ ID NO 16
<211> LENGTH: 37
<212> TYPE: DNA
<213> ORGANISM: Artificial sequence
<220> FEATURE:
<223> OTHER INFORMATION: synthetic primer

<400> SEQUENCE: 16
ggagacccaa gctggaccat gtcccagaca ggctcgc                                 37

<210> SEQ ID NO 17
<211> LENGTH: 41
<212> TYPE: DNA
<213> ORGANISM: Artificial sequence
<220> FEATURE:
<223> OTHER INFORMATION: synthetic primer

<400> SEQUENCE: 17
accaagctta agtttaaacg cttatttcct gcccgcccag g                            41

<210> SEQ ID NO 18
<211> LENGTH: 2514
<212> TYPE: DNA
<213> ORGANISM: Homo sapiens

<400> SEQUENCE: 18
atgtcccaga caggctcgca tcccgggagg ggcttggcag ggcgctggct gtggggagcc        60
caaccctgcc tcctgctccc cattgtgccg ctctcctggc tggtgtggct gcttctgcta       120
ctgctggcct ctctcctgcc ctcagcccgg ctggccagcc cctcccccg ggaggaggag        180 atcgtgtttc cagagaagct caacggcagc gtcctgcctg gctcgggcgc ccctgccagg       240
```

```
ctgttgtgcc gcttgcaggc cttttggggag acgctgctac tagagctgga gcaggactcc    300
ggtgtgcagg tcgaggggct gacagtgcag tacctgggcc aggcgcctga gctgctgggt    360
ggagcagagc ctggcaccta cctgactggc accatcaatg gagatccgga gtcggtggca    420
tctctgcact gggatggggg agccctgtta ggcgtgttac aatatcgggg ggctgaactc    480
cacctccagc ccctggaggg aggcaccct aactctgctg ggggacctgg ggctcacatc    540
ctacgccgga gagtcctgc cagcggtcaa ggtcccatgt gcaacgtcaa ggctcctctt    600
ggaagcccca gccccagacc ccgaagagcc aagcgctttg cttcactgag tagatttgtg    660
gagacactgg tggtggcaga tgacaagatg gccgcattcc acggtgcggg gctaaagcgc    720
tacctgctaa cagtgatggc agcagcagcc aaggccttca agcacccaag catccgcaat    780
cctgtcagct tggtggtgac tcggctagta atcctgggt caggcgagga gggcccaa     840
gtggggccca gtgctgccca gaccctgcgc agcttctgtg cctggcagcg ggcctcaac    900
accccctgagg actcggaccc tgaccacttt gacacagcca ttctgtttac ccgtcaggac    960
ctgtgtgagg tctccacttg cgacacgctg ggtatggcta atgtgggcac cgtctgtgac   1020
ccggctcgga gctgtgccat tgtggaggat gatgggctcc agtcagcctt cactgctgct   1080
catgaactgg gtcatgtctt caacatgctc catgacaact ccaagccatg catcagtttg   1140
aatgggcctt tgagcacctc tcgccatgtc atggcccctg tgatggctca tgtggatcct   1200
gaggagccct ggtcccctg cagtgcccgc ttcatcactg acttcctgga caatggctat   1260
gggcactgtc tcttagacaa accagaggct ccattgcatc tgcctgtgac tttccctggc   1320
aaggactatg atgctgaccg ccagtgccag ctgaccttcg ggcccgactc acgccattgt   1380
ccacagctgc cgccgccctg tgctgccctc tggtgctctg gccacctcaa tggccatgcc   1440
atgtgccaga ccaaacactc gccctgggcc gatggcacac cctgcgggcc cgcacaggcc   1500
tgcatgggtg gtcgctgcct ccacatggac cagctccagg acttcaatat tccacaggct   1560
ggtggctggg gtccttgggg accatggggt gactgctctc ggacctgtgg gggtggtgtc   1620
cagttctcct cccgagactg cacgaggcct gtccccggga atggtggcaa gtactgtgag   1680
ggccgccgta cccgcttccg ctcctgcaac actgaggact gcccaactgg ctcagccctg   1740
accttccgcg aggagcagtg tgctgcctac aaccaccgca ccgacctctt caagagcttc    1800
ccagggccca tggactgggt tcctcgctac acaggcgtgg ccccccagga ccagtgcaaa   1860
ctcacctgcc aggcccgggc actgggctac tactatgtgc tggagccacg ggtggtagat   1920
gggacccct gttccccgga cagctcctcg gtctgtgtcc agggccgatg catccatgct   1980
ggctgtgatc gcatcattgg ctccaagaag aagtttgaca agtgcatggt gtgcggaggg   2040
gacggttctg gttgcagcaa gcagtcaggc tccttcagga aattcaggta cggatacaac   2100
aatgtggtca ctatcccgc gggggccacc cacattcttg tccggcagca gggaaacgct   2160
ggccaccgga gcatctactt ggccctgaag ctgccagatg gctcctatgc cctcaatggt   2220
gaatacacgc tgatgccctc ccccacagat gtggtactgc ctgggcagt cagcttgcgc   2280
tacagcgggg ccactgcagc ctcagagaca ctgtcaggcc atgggccact ggcccagcct   2340
ttgacactgc aagtcctagt ggctggcaac cccaggaca cacgcctccg atacagcttc   2400
ttcgtgcccc ggccgacccc ttcaacgcca cgccccactc cccaggactg gctgcaccga   2460
agagcacaga ttctggagat ccttcggcgg cgcccctggg cgggcaggaa ataa          2514
```

<210> SEQ ID NO 19
<211> LENGTH: 837

<212> TYPE: PRT
<213> ORGANISM: Homo sapiens

<400> SEQUENCE: 19

Met Ser Gln Thr Gly Ser His Pro Gly Arg Gly Leu Ala Gly Arg Trp
1               5                   10                  15

Leu Trp Gly Ala Gln Pro Cys Leu Leu Pro Ile Val Pro Leu Ser
            20                  25                  30

Trp Leu Val Trp Leu Leu Leu Leu Leu Ala Ser Leu Leu Pro Ser
        35                  40                  45

Ala Arg Leu Ala Ser Pro Leu Pro Arg Glu Glu Ile Val Phe Pro
    50                  55                  60

Glu Lys Leu Asn Gly Ser Val Leu Pro Gly Ser Gly Ala Pro Ala Arg
65              70                  75                  80

Leu Leu Cys Arg Leu Gln Ala Phe Gly Glu Thr Leu Leu Glu Leu
            85                  90                  95

Glu Gln Asp Ser Gly Val Gln Val Glu Gly Leu Thr Val Gln Tyr Leu
                100                 105                 110

Gly Gln Ala Pro Glu Leu Leu Gly Gly Ala Glu Pro Gly Thr Tyr Leu
            115                 120                 125

Thr Gly Thr Ile Asn Gly Asp Pro Glu Ser Val Ala Ser Leu His Trp
130                 135                 140

Asp Gly Gly Ala Leu Leu Gly Val Leu Gln Tyr Arg Gly Ala Glu Leu
145                 150                 155                 160

His Leu Gln Pro Leu Glu Gly Gly Thr Pro Asn Ser Ala Gly Gly Pro
                165                 170                 175

Gly Ala His Ile Leu Arg Arg Lys Ser Pro Ala Ser Gly Gln Gly Pro
            180                 185                 190

Met Cys Asn Val Lys Ala Pro Leu Gly Ser Pro Ser Pro Arg Pro Arg
            195                 200                 205

Arg Ala Lys Arg Phe Ala Ser Leu Ser Arg Phe Val Glu Thr Leu Val
210                 215                 220

Val Ala Asp Asp Lys Met Ala Ala Phe His Gly Ala Gly Leu Lys Arg
225                 230                 235                 240

Tyr Leu Leu Thr Val Met Ala Ala Ala Lys Ala Phe Lys His Pro
                245                 250                 255

Ser Ile Arg Asn Pro Val Ser Leu Val Val Thr Arg Leu Val Ile Leu
            260                 265                 270

Gly Ser Gly Glu Glu Gly Pro Gln Val Gly Pro Ser Ala Ala Gln Thr
            275                 280                 285

Leu Arg Ser Phe Cys Ala Trp Gln Arg Gly Leu Asn Thr Pro Glu Asp
    290                 295                 300

Ser Asp Pro Asp His Phe Asp Thr Ala Ile Leu Phe Thr Arg Gln Asp
305                 310                 315                 320

Leu Cys Gly Val Ser Thr Cys Asp Thr Leu Gly Met Ala Asp Val Gly
                325                 330                 335

Thr Val Cys Asp Pro Ala Arg Ser Cys Ala Ile Val Glu Asp Asp Gly
            340                 345                 350

Leu Gln Ser Ala Phe Thr Ala Ala His Glu Leu Gly His Val Phe Asn
            355                 360                 365

Met Leu His Asp Asn Ser Lys Pro Cys Ile Ser Leu Asn Gly Pro Leu
370                 375                 380

Ser Thr Ser Arg His Val Met Ala Pro Val Met Ala His Val Asp Pro
385                 390                 395                 400

-continued

Glu Glu Pro Trp Ser Pro Cys Ser Ala Arg Phe Ile Thr Asp Phe Leu
                405                 410                 415
Asp Asn Gly Tyr Gly His Cys Leu Leu Asp Lys Pro Glu Ala Pro Leu
            420                 425                 430
His Leu Pro Val Thr Phe Pro Gly Lys Asp Tyr Asp Ala Asp Arg Gln
        435                 440                 445
Cys Gln Leu Thr Phe Gly Pro Asp Ser Arg His Cys Pro Gln Leu Pro
    450                 455                 460
Pro Pro Cys Ala Ala Leu Trp Cys Ser Gly His Leu Asn Gly His Ala
465                 470                 475                 480
Met Cys Gln Thr Lys His Ser Pro Trp Ala Asp Gly Thr Pro Cys Gly
                485                 490                 495
Pro Ala Gln Ala Cys Met Gly Gly Arg Cys Leu His Met Asp Gln Leu
            500                 505                 510
Gln Asp Phe Asn Ile Pro Gln Ala Gly Gly Trp Gly Pro Trp Gly Pro
        515                 520                 525
Trp Gly Asp Cys Ser Arg Thr Cys Gly Gly Gly Val Gln Phe Ser Ser
    530                 535                 540
Arg Asp Cys Thr Arg Pro Val Pro Arg Asn Gly Gly Lys Tyr Cys Glu
545                 550                 555                 560
Gly Arg Arg Thr Arg Phe Arg Ser Cys Asn Thr Glu Asp Cys Pro Thr
                565                 570                 575
Gly Ser Ala Leu Thr Phe Arg Glu Glu Gln Cys Ala Ala Tyr Asn His
            580                 585                 590
Arg Thr Asp Leu Phe Lys Ser Phe Pro Gly Pro Met Asp Trp Val Pro
        595                 600                 605
Arg Tyr Thr Gly Val Ala Pro Gln Asp Gln Cys Lys Leu Thr Cys Gln
    610                 615                 620
Ala Arg Ala Leu Gly Tyr Tyr Tyr Val Leu Glu Pro Arg Val Val Asp
625                 630                 635                 640
Gly Thr Pro Cys Ser Pro Asp Ser Ser Ser Val Cys Val Gln Gly Arg
                645                 650                 655
Cys Ile His Ala Gly Cys Asp Arg Ile Ile Gly Ser Lys Lys Lys Phe
            660                 665                 670
Asp Lys Cys Met Val Cys Gly Gly Asp Gly Ser Gly Cys Ser Lys Gln
        675                 680                 685
Ser Gly Ser Phe Arg Lys Phe Arg Tyr Gly Tyr Asn Asn Val Val Thr
    690                 695                 700
Ile Pro Ala Gly Ala Thr His Ile Leu Val Arg Gln Gln Gly Asn Ala
705                 710                 715                 720
Gly His Arg Ser Ile Tyr Leu Ala Leu Lys Leu Pro Asp Gly Ser Tyr
                725                 730                 735
Ala Leu Asn Gly Glu Tyr Thr Leu Met Pro Ser Pro Thr Asp Val Val
            740                 745                 750
Leu Pro Gly Ala Val Ser Leu Arg Tyr Ser Gly Ala Thr Ala Ala Ser
        755                 760                 765
Glu Thr Leu Ser Gly His Gly Pro Leu Ala Gln Pro Leu Thr Leu Gln
    770                 775                 780
Val Leu Val Ala Gly Asn Pro Gln Asp Thr Arg Leu Arg Tyr Ser Phe
785                 790                 795                 800
Phe Val Pro Arg Pro Thr Pro Ser Thr Pro Arg Pro Thr Pro Gln Asp
                805                 810                 815

```
Trp Leu His Arg Arg Ala Gln Ile Leu Glu Ile Leu Arg Arg Pro
            820                 825                 830
Trp Ala Gly Arg Lys
        835

<210> SEQ ID NO 20
<211> LENGTH: 29
<212> TYPE: DNA
<213> ORGANISM: Artificial sequence
<220> FEATURE:
<223> OTHER INFORMATION: synthetic primer

<400> SEQUENCE: 20
cactgctgct catgcgctgg gtcatgtct                                    29

<210> SEQ ID NO 21
<211> LENGTH: 29
<212> TYPE: DNA
<213> ORGANISM: Artificial sequence
<220> FEATURE:
<223> OTHER INFORMATION: synthetic primer

<400> SEQUENCE: 21
agacatgacc cagcgcatga gcagcagtg                                    29
```